(12) United States Patent
Hayashi

(10) Patent No.: US 6,587,245 B2
(45) Date of Patent: Jul. 1, 2003

(54) OPTICAL SCANNING DEVICE, OPTICAL SCANNING METHOD, AND IMAGE FORMING APPARATUS

(75) Inventor: Yoshinori Hayashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/910,797

(22) Filed: Jul. 24, 2001

(65) Prior Publication Data

US 2002/0039222 A1 Apr. 4, 2002

(30) Foreign Application Priority Data

Jul. 24, 2000 (JP) ........................................ 2000-222190

(51) Int. Cl.$^7$ .............................................. G02B 26/08
(52) U.S. Cl. ........................ 359/204; 359/212; 347/256
(58) Field of Search ................................ 359/197, 204, 359/212, 216, 217, 218, 219; 347/256, 259, 261

(56) References Cited

U.S. PATENT DOCUMENTS

| | | |
|---|---|---|
| 5,557,448 A | 9/1996 | Endo et al. |
| 5,570,224 A | 10/1996 | Endo et al. |
| 5,581,392 A | 12/1996 | Hayashi |
| 5,633,744 A | 5/1997 | Nakajima |
| 5,652,670 A | 7/1997 | Hayashi |
| 5,753,907 A | 5/1998 | Nakajima et al. |
| 5,786,594 A | 7/1998 | Ito et al. |
| 5,793,408 A | 8/1998 | Nakajima |
| 5,875,051 A | 2/1999 | Suzuki et al. |
| 5,936,756 A | 8/1999 | Nakajima |
| 5,986,791 A | 11/1999 | Suzuki et al. |
| 5,999,345 A | 12/1999 | Nakajima et al. |
| 6,052,211 A | 4/2000 | Nakajima |
| 6,069,724 A | 5/2000 | Hayashi et al. |
| 6,081,386 A | 6/2000 | Hayashi et al. |
| 6,091,534 A | 7/2000 | Nakajima |
| 6,104,522 A | 8/2000 | Hayashi et al. |
| 6,141,133 A | 10/2000 | Suzuki et al. |
| 6,185,026 B1 | 2/2001 | Hayashi et al. |
| 6,198,562 B1 | 3/2001 | Hayashi et al. |
| 6,218,660 B1 * | 4/2001 | Hada ........................ 250/226 |
| 6,222,662 B1 | 4/2001 | Suzuki et al. |
| 6,229,638 B1 | 5/2001 | Hayashi et al. |
| 6,400,917 B2 | 6/2002 | Nakazato et al. |

* cited by examiner

Primary Examiner—Mark A. Robinson
(74) Attorney, Agent, or Firm—Oblon, Spivak, McClelland, Maier & Neustadt, P.C.

(57) ABSTRACT

An optical scanning device which divides an area to be scanned on a surface to be scanned into n (wherein n≧2) partial scanning portions in a longitudinal direction thereof. The scanning device includes n light sources respectively corresponding to the n partial scanning portions and configured to optically scan the n partial scanning portions with respective light fluxes from the n light sources thereby to scan the areas. The optical scanning device includes a deflecting device configured to deflect the light fluxes from the n light sources, and a scan imaging optical device configured to converge the light fluxes deflected by the deflecting device toward the surface to be scanned, so that each of the respective light fluxes forms an optical spot on a corresponding partial scanning portion of the n partial scanning portions. With a line width of one-dot lines formed by scanning with a corresponding light flux near a center portion of an $i^{th}$ partial scanning portion of the n partial scanning portions as Li (wherein i=1 through n), an optical scanning condition is set so that an average value Ave(Li), a maximum value Max(Li), and a minimum value Min(Li), of line widths Li of the one-dot lines satisfy a condition of:

$$Max(Li)/1.15 < Ave(Li) < Min(Li)/0.85.$$

216 Claims, 5 Drawing Sheets

FIG. 2A
LIGHT INTENSITY DISTRIBUTION OF LIGHT SPOT

FIG. 2B
LIGHT INTENSITY DISTRIBUTION OF LIGHT SPOT

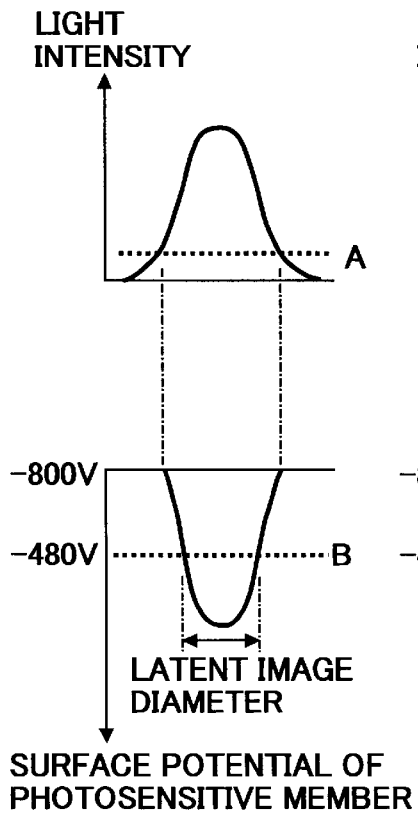
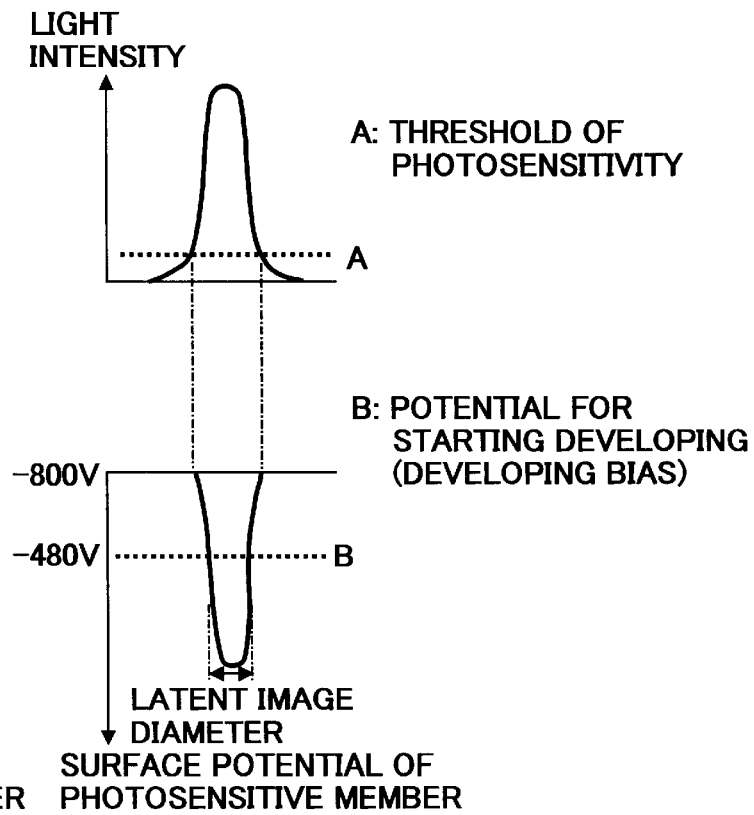

A: THRESHOLD OF PHOTOSENSITIVITY

B: POTENTIAL FOR STARTING DEVELOPING (DEVELOPING BIAS)

FIG. 2C
PHOTOSENSITIVE MEMBER POTENTIAL DISTRIBUTION OF DOT LATENT IMAGE

FIG. 2D
PHOTOSENSITIVE MEMBER POTENTIAL DISTRIBUTION OF DOT LATENT IMAGE

FIG. 2E
PHOTOSENSITIVE MEMBER POTENTIAL DISTRIBUTION OF DOT LATENT IMAGE FOLLOWING ADJUSTMENT

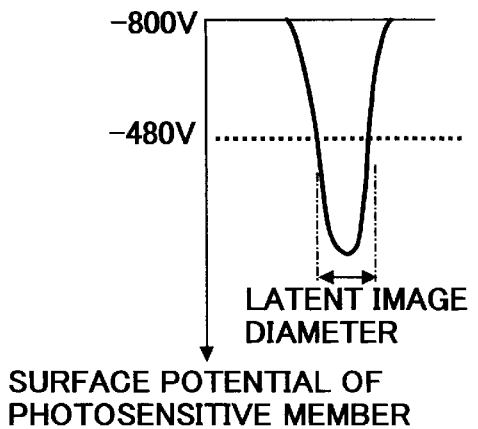

REFLECTIVITY DISTRIBUTION IN LINE WIDTH
DIRECTION OF ONE-DOT LINE

OPTICAL SCANNING DEVICE, OPTICAL SCANNING METHOD, AND IMAGE FORMING APPARATUS

BACKGROUND OF THE INVENTION

1. Field of the Invention

The present invention relates to an optical scanning device, optical scanning method, and image forming apparatus.

2. Discussion of the Background

There has been proposed an optical scanning method which divides an area to be scanned on a surface to be scanned into n (wherein $n \geq 2$) partial scanning portions in the longitudinal direction and uses n light sources corresponding to the partial scanning portions on a one-to-one basis to optically scan the partial scanning portions corresponding to the light fluxes from the n light sources, thereby synthetically optically scanning the area to be scanned (Japanese Unexamined Patent Application Publication No. 7-199098, Japanese Unexamined Patent Application Publication No. 10-213763, etc.).

Such an optical scanning method (hereafter referred to as "segmented scanning") has the following advantages.

First, increasing the number n of partial scanning portions constituting the area to be scanned allows optical scanning to be performed over extremely wide scanning areas.

Second, each partial scanning portion can be made small, so that in the event of individually providing plural scan imaging optical systems for each partial scanning portion, for example, the angle of each scan imaging optical system does not have to be made unnaturally wide, and the plural scan imaging optical systems and the optical elements constituting the plural scan imaging optical systems can be made small. Further, correction of wave-front aberrations which are correlated with the light spot diameter can be facilitated, and there is less difference in spot diameter due to irregularities in parts and attachment variances, so that the diameter of the light spot can be reduced.

However, on the other hand, dividing the area to be scanned into multiple partial scanning portions results in the optical scanning of the partial scanning portions by separate light fluxes, and in the event that the intensity of light, spot diameter, optical scanning speed, etc., of the light spots irradiating the surfaces to be scanned differ from one partial scanning portion to the next, the latent image written by optical scanning upon developing will show irregularities in concentration as the image density differs from one partial scanning portion to another, e.g., the concentration of band-shaped portions extending in the sub-scanning direction, corresponding to the partial scanning portions, can change cyclically according to the length of the partial scanning portions in the main scanning direction.

A non-uniformity in the intensity of light irradiated on the surface to be scanned from one partial scanning portion to the next can occur due to variances the emitted light intensity between different light sources and the properties of transmittance and reflectance of the optical elements situated between the different light sources and the partial scanning portions.

Also, a non-uniformity in the spot diameter from one partial scanning portion to another can occur due to manufacturing variances in the individual optical elements situated between the different light sources and the partial scanning portions, variances in the precise attachment thereof, and so forth.

Further, a non-uniformity in the optical scanning speed from one partial scanning portion to another can occur due to manufacturing variances in the fθ lens used as the scan imaging optical system, and variances in the precision of attachment thereof.

When there is a difference in image density at image portions corresponding to adjacent partial scanning portions, the image density or concentration changes in steps at the portion corresponding to a seam between the partial scanning portions, and accordingly irregularities in image density tend to be conspicuous.

With the invention described in Japanese Unexamined Patent Application Publication No. 10-213763, the arrangement is such that the amount of light flux optically scanned in each partial scanning portion is uniform near a seam between adjacent partial scanning portions. However, irregularities in concentration can still occur if the spot diameter or optical scanning speed differs from one partial scanning portion to another.

SUMMARY OF THE INVENTION

The present invention has been made in view of the above-discussed and other problems and addresses the above-discussed and other problems.

Accordingly, preferred embodiments of the present invention provide a novel optical scanning device and a novel optical scanning method that effectively reduce the above-described image density or concentration irregularities in optical scanning performed by segmented scanning, and thereby make irregularities in concentration less conspicuous.

According to a preferred embodiment of the present invention, an optical scanning device divides an area to be scanned on a surface to be scanned into n (wherein $n \geq 2$) partial scanning portions in the longitudinal direction, and uses n light sources corresponding to the n partial scanning portions on a one-to-one basis to optically scan the n partial scanning portions with respective light fluxes from the n light sources, thereby scanning optically the area to be scanned. The optical scanning device includes a deflecting device and a scan imaging optical device.

The n light sources are each independently capable of modulating the intensity of the emitted light. For example, n solid lasers or gas lasers, n LEDs, etc., may be used. Most practically, n semiconductor lasers may be used.

The n number of light sources is not restricted to those mentioned above. Each light source may have a plurality of light-emitting sources which are each independently capable of modulating the intensity of the emitted light, such as for example articles wherein light fluxes from multiple semiconductor lasers are synthesized with a light flux synthesizing prism, articles wherein light fluxes from multiple semiconductor lasers are mutually given angles and combined, semiconductor laser arrays, etc. Using such light sources for each partial scanning portion allows each partial scanning portion to be optically scanned with the multi-beam scanning method such that multiple lines in the area to be scanned are simultaneously synthetically scanned optically.

The deflecting device deflects the light fluxes from the n light sources, and an appropriate known deflector (e.g., a rotating unifacial mirror, a rotating bifacial mirror, a rotating polygonal mirror, a galvano-mirror, etc.) may be used.

One deflector may be provided for each of the n light sources so that the deflecting device is configured with a total of n deflectors. Alternatively, two or more light sources may share one deflector so that the deflecting device is configured from a number of deflectors which is less than the number n of light sources.

The scan imaging optical device is an optical device for converging each light flux deflected by the deflecting device toward the surface to be scanned, thereby forming a light spot at the partial scanning portion from each light flux.

For example, one set of image scanners (i.e. a scan imaging optical system) may be provided for each of the n light sources, thereby configuring the scan imaging optical device with n sets of image scanners. Alternatively, one set of image scanners which are configured to converge individual light flux from two or more light sources to the respective corresponding partial scanning portions may be utilized, thereby configuring the scan imaging optical device with a number of image scanners which is less than the number n of light sources. Accordingly in this alternate embodiment, when the number of light sources n=2, the scan imaging optical device is configured with only one image scanner.

Each of the image scanners may be configured with one or more lenses, or may be configured with one or more imaging reflectors (reflectors having imaging capabilities), or may be configured with a combination of one or more lenses and one or more imaging reflectors.

The "surface to be scanned" is essentially the photosensitive surface of the photo-electroconducting photosensitive member.

A partial scanning portion is each portion obtained by dividing the area to be scanned on the photosensitive face into n pieces in a longitudinal direction. Each partial scanning portion may have the same length, or may have mutually different lengths.

Also, each partial scanning portion may divide the same line in the main scanning direction into n parts, or, the partial scanning portions may be separated in the sub-scanning direction. When the partial scanning portions are separated in the sub-scanning direction, the timing for performing scanning of each partial scanning portion is offset, so that partial latent images formed on the n partial scanning portions connect one to another to form line in the latent image (multiple lines of the latent image in the event that the light source has multiple light sources).

The optical scanning device according to a first aspect of the present invention is arranged such that with the line width of one-dot lines, formed by scanning with the corresponding light flux near the center portion of the $i^{th}$ partial scanning portion of the n partial scanning portions, denoted as Li (wherein i=1 through n), the optical scanning condition is set so that the average value Ave(Li), the maximum value Max(Li), and the minimum value Min(Li), of the line widths Li of the one-dot lines satisfy the condition of:

$$\text{Max}(Li)/1.15 < \text{Ave}(Li) < \text{Min}(Li)/0.85. \tag{1}$$

The term "one-dot line" refers to a line-shaped latent image formed of a continuation of single dots.

The definition of the line width Li will be described later.

The average value Ave(Li) denotes the arithmetical mean of the line widths Li, i.e., (ΣLi)/n (wherein the sum is from 1 to n depending on i). This definition for Ave (Li) holds true in the following description, as well. The maximum value Max(Li) is the largest of the n number of line widths Li, and the minimum value Min(Li) is the smallest of the n number of line widths Li.

The optical scanning device according to a second aspect of the present invention is arranged such that with the line width and line concentration of one-dot lines formed by scanning with the corresponding light flux near the center portion of the $i^{th}$ partial scanning portion denoted as Li and Di respectively (wherein i=1 through n), the optical scanning condition is set so that the average value Ave{√(Li)×Di^(⅕)}, the maximum value Max{√(Li)×Di^(⅕)}, and the minimum value Min {√(Li)×Di^(⅕)}, of the computation value √(Li)×Di^(⅕) of the one-dot lines satisfy the condition of:

$$\text{Max}\{\sqrt{(Li)} \times Di\hat{}(\tfrac{1}{5})\}/1.15 < \text{Ave}\{\sqrt{(Li)} \times Di\hat{}(\tfrac{1}{5})\} < \text{Min}\{\sqrt{(Li)} \times Di\hat{}(\tfrac{1}{5})\}/0.85. \tag{2}$$

In the above expression, "Di^(⅕)" is "Di to the 1/5th power, i.e., "^" indicates an exponent. This definition of Di^(1/S) (1 holds true in all of the following description, as well.

The definition of the line concentration Di will be described later.

The average value Ave{√(Li)×Di^(⅕)} is the arithmetical mean of n number of computation values √(Li)×Di^(⅕), wherein i=1 through n, the maximum value Max{√(Li)×Di^(⅕)} is the greatest of the n computation values √(Li)×Di^(⅕), wherein i=1 through n, and the minimum value Min {√(Li)×Di^(⅕)} is the smallest of the n computation values √(Li)×Di^(⅕), wherein i=1 through n.

With the optical scanning device according to the second aspect, the average value Ave{√(Li)×Di^(⅕)}, the maximum value Max{√(Li)×Di^(⅕)}, and the minimum value Min {√(Li)×Di^(⅕)}, of the computation value √(Li)×Di^(⅕) more preferably satisfy the condition of:

$$\text{Max}\{\sqrt{(Li)} \times Di\hat{}(\tfrac{1}{5})\}/1.07 < \text{Ave}\{\sqrt{(Li)} \times Di\hat{}(\tfrac{1}{5})\} < \text{Min}\{\sqrt{(Li)} \times Di\hat{}(\tfrac{1}{5})\}/0.93. \tag{2A}$$

Here, near the center portion of the $i^{th}$ partial scanning portion, one-dot lines formed by scanning with the corresponding light flux may be one-dot lines which are long in the main scanning direction, one-dot lines which are long in the sub-scanning direction, or one-dot lines which are inclined in the main scanning direction.

In the event that the one-dot lines are one-dot lines which are elongated in the main scanning direction, and in the event that the light source has multiple light-emitting sources and the partial scanning portions are optically scanned by multi-beam scanning, the above conditions are satisfied by "each of the multiple one-dot lines" formed by multi-beam scanning. This criterion holds true in all of the following description, as well.

With the optical scanning device according to the first aspect, near the center portion of the $i^{th}$ partial scanning portion, the condition (1) is preferably satisfied by the one-dot lines which are elongated in the main scanning direction and the one-dot lines which are elongated in the sub-scanning direction, formed by scanning with the corresponding light flux.

With the optical scanning device according to the second aspect, near the center portion of the $i^{th}$ partial scanning portion, the condition (2) is preferably satisfied by the one-dot lines which are elongated in the main scanning direction and the one-dot lines which are elongated in the sub-scanning direction, formed by scanning with the corresponding light flux, and further, near the center portion of the $i^{th}$ partial scanning portion, the condition (2A) is preferably satisfied by the one-dot lines which are elongated in the main scanning direction and the one-dot lines which are elongated in the sub-scanning direction, formed by scanning with the corresponding light flux.

The optical scanning device according to a third aspect of the present invention is arranged such that with a line width ratio $L_i/L_{i+1}$ (wherein i=1 through n−1) of one-dot lines, formed by scanning with the corresponding light flux long in the sub-scanning direction near a seam between the $i^{th}$ partial scanning portion and the i+1$^{th}$ partial scanning portion, denoted as a sub-scanning line width ratio KS, the optical scanning condition is set such that the sub-scanning line width ratio KS satisfies the condition of:

$$0.9<KS<1.1. \qquad (3)$$

The optical scanning device according to a fourth aspect of the present invention is arranged such that with a line width ratio $L_i/L_{i+1}$ (wherein i=1 through n−1) of one-dot lines, formed by scanning with the corresponding light flux long in the main scanning direction near the seam between the $i^{th}$ partial scanning portion and the i+1$^{th}$ partial scanning portion, denoted as a main scanning line width ratio KM, the optical scanning condition is set such that the main scanning line width ratio KM satisfies the condition of:

$$0.93<KM<1.07. \qquad (4)$$

In the third aspect of the present invention, with the line width ratio $L_i/L_{i+1}$ (wherein i=1 through n−1) of one-dot lines, formed by scanning with the corresponding light flux long in the main scanning direction near the seam between the $i^{th}$ partial scanning portion and the i+1$^{th}$ partial scanning portion, denoted as the main scanning line width ratio KM, the optical scanning condition is preferably set such that the main scanning line width ratio KM satisfies the condition of:

$$0.93<KM<1.07. \qquad (4)$$

The optical scanning device according to a fifth aspect of the present invention is arranged such that with the line width ratio $L_i/L_{i+1}$ (wherein i=1 through n−1) of one-dot lines, formed by scanning with the corresponding light flux long in the sub-scanning direction near the seam between the $i^{th}$ partial scanning portion and the i+1$^{th}$ partial scanning portion, denoted as the sub-scanning line width ratio KS, and a line concentration ratio $D_i/D_{i+1}$ denoted as a line concentration ratio HS, the optical scanning condition is set such that the computation amount $\sqrt{(KS)} \times HS^{\wedge}(1/5)$ satisfies the condition of:

$$0.9<\sqrt{(KS)} \times HS^{\wedge}(1/5)<1.1. \qquad (5)$$

There are a total of n−1 computation amounts $\sqrt{(KS)} \times HS^{\wedge}(1/5)$ since a computation amount is obtained near each seam of adjacent partial scanning portions, and these n−1 computation amounts satisfy the condition (5).

The optical scanning device according to a sixth aspect of the present invention is arranged such that with the line width ratio $L_i/L_{i+1}$ (wherein i=1 through n−1) of one-dot lines, formed by scanning with the corresponding light flux long in the main scanning direction near the seam between the $i^{th}$ partial scanning portion and the i+1$^{th}$ partial scanning portion as the main scanning line width ratio KM, and a line concentration ratio $D_i/D_{i+1}$, denoted as a line concentration ratio HM, the optical scanning condition is set such that the computation amount $\sqrt{(KM)} \times HM^{\wedge}(1/5)$ satisfies the condition of:

$$0.93<\sqrt{(KM)} \times HM^{\wedge}(1/5)<1.07. \qquad (6)$$

In the fifth aspect, with the line width ratio $L_i/L_{i+1}$ (wherein i=1 through n−1) of one-dot lines formed by scanning with the corresponding light flux elongated in the main scanning direction near the seam between the $i^{th}$ partial scanning portion and the i+1$^{th}$ partial scanning portion, denoted as the main scanning line width ratio KM, and the line concentration ratio $D_i/D_{i+1}$ denoted as the line concentration ratio HM, the optical scanning condition is preferably set such that the computation amount $\sqrt{(KM)} \times HM^{\wedge}(1/5)$ satisfies the condition of:

$$0.93<\sqrt{(KM)} \times HM^{\wedge}(1/5)<1.07. \qquad (6)$$

With the fifth and sixth aspects, there are a total of n−1 computation amounts $\sqrt{(KM)} \times HM^{\wedge}(1/5)$ since a computation amount is obtained near each seam of adjacent partial scanning portions, and these n−1 computation amounts satisfy the condition (6).

In any of the above-described arrangements, a set light-emitting amount (i.e. an intensity) of the n light sources may be independently adjustable. The set light-emitting amount is the intensity in a reference light-emitting state which serves as a reference for intensity modulation, and can be set by a reference driving current value in the case of semiconductor lasers.

Arranging for the intensity of the light sources to be independently adjustable allows the above-described conditions (1) through (6) to be satisfied.

Also, in any of the above-described arrangements, a driving duty ratio (i.e., the ratio of light-emitting time of a light-emitting source relative to the writing time corresponding to one pixel) of the n light sources may be independently settable. Adjusting the driving duty ratio of the light sources allows the size of a dot image obtained by visualizing a dot formed by the light source to be adjusted, enabling independent adjustment of the driving duty ratio of each light source which allows the above-described conditions (1) through (6) to be satisfied. In this case, the adjustment of the driving duty ratio may be combined with the above-described adjustment of the light intensity.

Also, in any of the above-described arrangements, the openings of n number of apertures are configured to beam form each of the light fluxes from the n light sources independently.

The opening of each aperture defines a spot diameter, so that, by adjusting the opening of each of the apertures in both the main scanning and sub-scanning directions, independent adjustment of the size and shape of the light spot on the surface to be scanned is obtained in both the main scanning and sub-scanning directions. The opening of each aperture can be employed to satisfy the above-described conditions (1) through (6). In this case, adjusting the openings of the apertures may be combined with the adjustment of the duty ratio and/or the adjustment of the light intensity.

In any of the above-described arrangements, the number n of light sources may be two, and in this case, the deflecting device may be configured of two optical deflectors for individually deflecting each light flux from each light source. Here, the scan imaging optical device may be configured with two image scanners configured to individually converge light flux from each of the light sources toward the area to be scanned.

Also, in any of the above-described arrangements, the optical scanning device may include photo-receptors at the starting side and ending side of optical scanning device for performing photo-reception of deflected light flux, from each partial scanning portion. In this case, one photo-receptor may be placed between adjacent partial scanning portions, with the photo-receptor photo-receiving deflected light flux at an ending side of one partial scanning portion and also photo-receiving deflected light flux at a starting side of the other partial scanning portion. When each light source has multiple light-emitting sources and optical scanning of each partial scanning portion is carried out by multi-beam scanning, the arrangement may involve photo-reception of only one of the multiple light fluxes scanning the same partial scanning portion or all of the multiple light fluxes.

The optical scanning method according to the present invention divides an area to be scanned on a surface to be scanned into n (wherein n≧2) partial scanning portions in the longitudinal direction and uses n light sources corresponding to the n partial scanning portions on a one-to-one basis to optically scan the partial scanning portions with corresponding light fluxes from the n light sources, thereby synthetically optically scanning the area to be scanned. The optical scanning method may be carried out using the optical scanning device according to the present invention, in any of the arrangements described above.

The optical scanning method may be carried out using the optical scanning device including photo-receptors at the starting side and ending side of optical scanning device for photo-receiving deflected light fluxes, at each partial scanning portion. Correspondingly, a driving clock for each light source corresponding to each partial scanning portion is adjusted based on a difference in detection time.

The image forming apparatus according to the present invention forms an electrostatic latent image by optically scanning a photo-electroconducting photosensitive member with an optical scanning device, and developing the electrostatic latent image as a toner image to obtain an image. The optical scanning device of any of the arrangements described above may be used as the optical scanning device for optically scanning the photosensitive member.

An electrostatic latent image is formed by uniform charging of the photosensitive face of the photosensitive member and optical scanning by the optical scanning device. The electrostatic image is developed as a toner image. In the event that the photo-electroconducting photosensitive member is, for example, a sheet-shaped base with a photo-electroconducting layer of zinc oxide or the like formed thereupon, the toner image is fixed to the photosensitive member. In the event of using a photosensitive member such as a Se photosensitive member, the obtained toner image can be transferred and fixed onto a sheet-shaped recording medium such as a transfer paper, an OHP sheet (i.e., a plastic sheet for use with an overhead projector), and so forth.

The image forming apparatus according to the present invention can be carried out as a digital photocopier, an optical printer, an optical plotter, a facsimile apparatus, and so forth.

Note that the number n of partial scanning portions is two or more, as described above, and there is no particular restriction to the upper limit thereof. The number n can be selected as appropriate according to the size and so forth of the area to be scanned.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 2 is a diagram depicting a light intensity distribution of a light spot, and a potential distribution of a one-dot latent image written with the light spot;

DETAILED DESCRIPTION OF THE PREFERRED EMBODIMENTS

Figure 1:
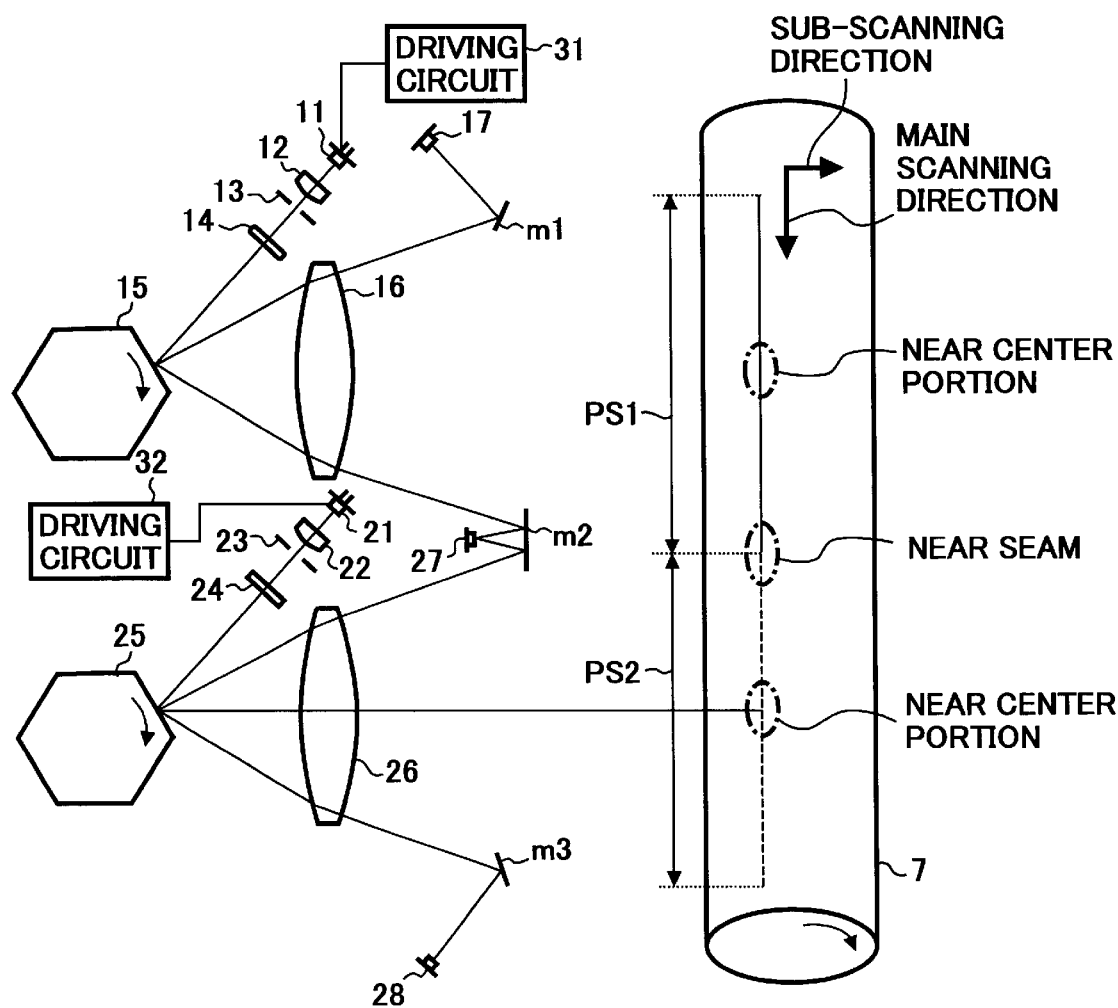
FIG. 1 is a diagram illustrating a first embodiment of the optical scanning device.

Referring now to the drawings, wherein like reference numerals designate identical or corresponding parts throughout the several views, preferred embodiments of the present invention are described.

FIG. 1 is an explanatory diagram illustrating an optical scanning device according to a preferred embodiment of the present invention.

In FIG. 1, reference numerals 11 and 21 each denote semiconductor lasers serving as light sources, 12 and 22 each denote coupling lenses, 13 and 23 each denote beam forming apertures, 14 and 24 each denote cylindrical lenses, 15 and 25 each denote rotating polygonal mirrors serving as deflecting devices, and 16 and 26 each denote scanning lenses serving as scan imaging optical systems constituting scan imaging optical devices.

Also, reference numerals m1, m2, and m3 each denote mirrors, 17, 27, and 28 each denote photo-receptors, and 7 denotes a photo-electroconducting photosensitive member which is the entity of the surface to be scanned. Also, reference numerals 31 and 32 denote driving circuits for driving the semiconductor lasers 11 and 21.

The photosensitive member 7 is cylindrical, and the perimeter thereof is formed as the photosensitive face. As shown in FIG. 1, the generatrix of the perimeter of the photosensitive member 7 is the main scanning direction thereof, and the sub-scanning direction is the direction in which the perimeter of the photosensitive member 7 moves according to the rotation thereof.

In the present embodiment, the area to be scanned on the surface to be scanned is divided into two partial scanning portions PS1 and PS2, with the light flux from the semiconductor laser 11 optically scanning the partial scanning portion PS1 and the light flux from the semiconductor laser 21 optically scanning the partial scanning portion PS2. The optical scanning performed on the partial scanning portions PS1 and PS2 is illustrated as single-beam scanning from lasers 11 and 21, respectively.

Optical scanning on the photosensitive member 7 is performed as follows. The photosensitive member 7 rotates in the direction indicated by the arrow, at a constant speed. The image information to be written by optical scanning is divided into information portions to be written one line at a time to the partial scanning portions PS1 and PS2. The driving circuit 31 modulates the light-emitting intensity of the semiconductor laser 11 following a predetermined clock, according to an information portion to be written to the partial scanning portion PS1. In the same way, the driving circuit 32 modulates the light-emitting intensity of the semiconductor laser 21 following the predetermined clock, according to an information portion to be written to the partial scanning portion PS2.

The light flux emitted from the semiconductor laser 11 is converted by the coupling lens 12 into a light flux form which is suitable for the subsequent optical system. The light flux form emitted from the coupling lens 12 may be any of a parallel light flux, a divergent light flux with the degree of divergence thereof weakened, or a converging light flux. In the following description, the light flux form emitted from the coupling lens 12 will be described as being a parallel light flux, for the sake of concreteness.

The light flux passes through the opening of the aperture 13, and thereby the surrounding portions of the parallel light flux is shielded so that a beam is formed. Then, the light flux is converged in the sub-scanning direction by the cylindrical lens 14, and is imaged near the deflection reflection face of the rotating polygonal mirror 15 as a line image longitudinal in the main scanning direction.

Rotating of the rotating polygonal mirror 15 at a constant speed causes the light flux reflected at the deflecting reflecting face to become a deflected light flux which is deflected at a constant angular speed, thereby forming a light spot on the photosensitive member 7 by the action of a scanning lens 16 and optically scanning the partial scanning portion PS1, and consequently performing image writing. The scanning lens 16 is a fθ lens configured such that the scanning speed of the light spot on the photosensitive member 7 is constant.

The light flux from the semiconductor laser 21 optically scanning the partial scanning portion PS2 is performed in exactly the same manner as the light flux from the semiconductor laser 11 optically scanning the partial scanning portion PS1.

That is to say, the light flux emitted from the semiconductor laser 21 is converted by the coupling lens 22 into a parallel light flux, subjected to beam forming by the aperture 23, converged in the sub-scanning direction by the cylindrical lens 24, and is imaged near the deflection reflection face of the rotating polygonal mirror 25 as a line image longitudinal in the main scanning direction. Rotating of the rotating polygonal mirror 25 at a constant speed causes the light flux reflected at the deflecting reflecting face to become a deflected light flux which is deflected at a constant angular speed, thereby forming a light spot on the photosensitive member 7 by the action of a scanning lens 26 and optically scanning the partial scanning portion PS2, and consequently performing image writing. The scanning lens 26 is also an fθ lens configured such that the optical scanning speed of the light spot on the photosensitive member 7 is constant.

Deflected light flux for optically scanning the partial scanning portion PS1 is initially incident onto the photoreceptor 17 via the mirror m1 during deflection toward the partial scanning portion PS1, and generates scan start signals. The timing of starting optical scanning of the partial scanning portion PS1 is determined based on the scan start signals generated from photoreceptor 17. In the same way, deflected light flux for optically scanning the partial scanning portion PS2 is initially incident onto the photo-receptor 27 via the mirror m2 during deflection toward the partial scanning portion PS2, and also generates scan start signals. The timing of the starting optical of scanning of the partial scanning portion PS2 is determined based on the scan start signals generated from photoreceptor 27.

After completing optical scanning of the partial scanning portion PS1, deflected light flux from the semiconductor laser 11 becomes incident onto the photo-receptor 27 via the mirror m2, thereby generating optical scan end signals generated by photoreceptor 27. Also, after completing optical scanning of the partial scanning portion PS2, deflected light flux from the semiconductor laser 21 becomes incident onto the photo-receptor 28 via the mirror m3, thereby generating scan end signals generated by photoreceptor 28.

The time interval T1 between the scan start signals generated by the photo-receptor 17 and the scan end signals generated by the photo-receptor 27 corresponds to the time for the light flux from the semiconductor laser 11 to optically scan the partial scanning portion PS1. In the same way, the time interval T2 between the scan start signals generated by the photo-receptor 27 and the scan end signals generated by the photo-receptor 28 corresponds to the time for the light flux from the semiconductor laser 21 to optically scan the partial scanning portion PS2.

Based on the time intervals T1 and T2, the clock of the intensity modulation of the semiconductor lasers 11 and 12 is adjusted to reduce overlapping and discontinuity of the scanning lines at a seam portion between the partial scanning portions PS1 and PS2.

Note that, in order to prevent the scan end portion of the partial scanning portion PS1 and the scan start portion of the partial scanning portion PS2 from being offset in the sub-scanning direction, measures are taken such as adjusting the optical scanning timing at the partial scanning portions, for example by minutely inclining the scanning lines (i.e., the track of the light spot) of the partial scanning portions in the main scanning direction according to the rotational speed of the photosensitive member 7 (i.e. the speed of displacement in the sub-scanning direction), and so forth, to thereby ensure that straight lines in the main scanning direction written on each of the partial scanning portions and to produce mutually connected straight lines.

When, as shown in the embodiment in FIG. 1, the area to be scanned is divided into partial scanning portions PS1 and PS2 and optically scanned with different light fluxes, irregularities in concentration between image portions formed by the different light fluxes will occur.

For an electrophotographic process, the process for image forming is generally carried out in the following order: charging of the photosensitive member, exposing of the image, developing, transferring, and fixing. In the case of the present embodiment shown in FIG. 1, the charging, developing, transferring, and fixing are performed common to both partial scanning portions PS1 and PS2, so that these processes are not a major factor in the occurrence of the above-described irregularities in image density or concentration. The major factor contributing to irregularities in image density or concentration is considered to be difference in image exposure occurring at the time that the image is written to each partial scanning portion.

With the invention described in the aforementioned Japanese Unexamined Patent Application Publication No. 10-213763, the difference in concentration at the seam is made to be less conspicuous, by making the intensity of light spots from the deflected light fluxes to be uniform at the seam between the partial scanning portions. However, even when the intensity of light of the light spots is made to be uniform, differences in spot diameter and constant-speed properties between the deflected light fluxes will result in irregularities in concentration occurring, making irregularities in concentration at the seam more conspicuous.

Now, with reference to FIGS. 2A–2E, suppose that the light intensity distribution of the light spot emitted from the semiconductor laser 11 and formed on the partial scanning portion PS1 is as shown in FIG. 2A. In the same way, suppose that the light intensity distribution of the light spot emitted from the semiconductor laser 21 and formed on the partial scanning portion PS1 is as shown in FIG. 2B.

If the light fluxes emitted from the semiconductor lasers 11 and 12 are the same intensity at the light spots formed at the corresponding partial scanning portions, then hypothetically the integrated intensity of light shown in FIGS. 2A and 2B (i.e., the intensity of light at the light spots) would be the same.

However, the optical elements (coupling lens, cylindrical lens, rotating polygonal mirror, scanning lens, etc.) on the optical path from the semiconductor lasers 11 and 12 to the partial scanning portions PS1 and PS2 are not physically identical, and further, these optical elements cannot be placed geometrically congruent. Accordingly, even if the amount of light emitted from the semiconductor lasers 11 and 12 were the same so that the amount of light of the light spots were the same, then the intensity distribution of the light spots would be different, as shown in FIGS. 2A and 2B.

FIG. 2C illustrates the distribution of potential on the surface of the photosensitive member 7 when a one-dot latent image is formed with a light spot having the light intensity distribution of FIG. 2A. Similarly, FIG. 2D illustrates the distribution of potential on the surface of the photosensitive member 7 when a one-dot latent image is formed with a light spot having the light intensity distribution of FIG. 2B. The FIGS. 2C and 2D have a constant charging potential on the photosensitive member 7 of −800 V.

When performing inverse developing of an electrostatic latent image on the photosensitive member, the area developed starts developing at a potential of −480 V, depicted in FIGS. 2C and 2D as the latent image diameter.

Accordingly, when there are differences in the latent image diameter of the electrostatic latent image formed on the photosensitive member due to differences in intensity of light of the light spots, there will be differences in the size and concentration of each dot making up each pixel in the obtained toner image. There differences produce the aforementioned concentration irregularities.

Figure 3:
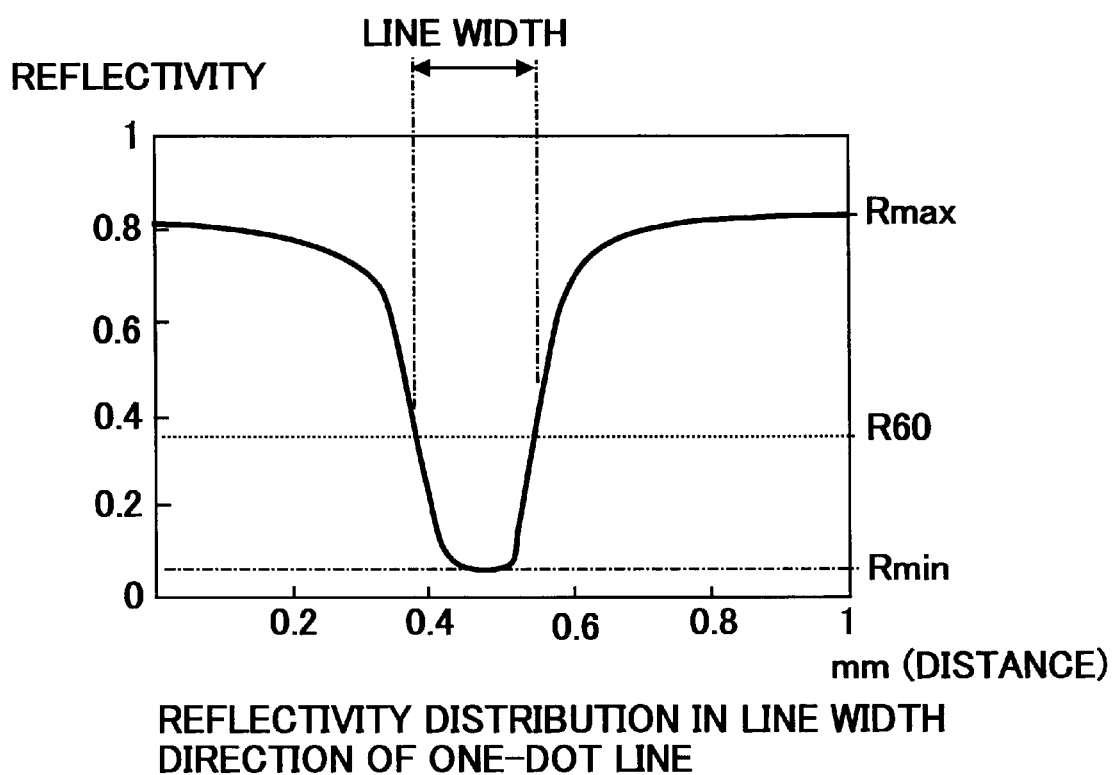
FIG. 3 is a diagram depicting a concentration distribution in a width direction of a formed one-dot line.

FIG. 3 illustrates a typical distribution of reflectance in a visible image, obtained by forming a line-shaped latent image of a continuation of single dots on the photosensitive member and developing the latent image, in a direction orthogonal to the line length of the one-dot line, i.e., in the line width direction.

Now, the one-dot line is a black image formed on a white sheet-shaped recording medium. Accordingly, the maximum reflectance Rmax in FIG. 3 includes the reflectance of the white portion, and the reflectance of the one-dot line is an inverse Gaussian distribution curve in the width direction of the line, as shown in FIG. 3.

The minimum reflectance Rmin in FIG. 3 is the reflectance of a portion where the concentration of the black image is the greatest in the width direction of the one-dot line.

Now, defining an amount of R60 with an expression $$R60 = Rmax - 0.6 \times (Rmax - Rmin)$$

using the maximum reflectance Mmax and minimum reflectance Mmin, R60 is 60% of the reflectance difference (Rmax−Rmin) subtracted from the maximum reflectance Rmax. The width of the one-dot line is defined as the distance between the left and right edges of the reflectance at the R60 value. The reflectance distribution is thereof binarized with this R60 as a threshold value.

Now returning to FIG. 1, suppose that one-dot lines are formed at the image portions corresponding to positions near the center of the partial scanning portions PS1 and PS2 (the lines may be long in the main scanning direction, long in the sub-scanning direction, or inclined in the main scanning direction), and that the line width of the one-dot lines is Li (wherein i=1, 2).

Near the center of the partial scanning portions PS1 and PS2, the average value Ave(Li), maximum value Max(Li), and minimum value Min (Li), of the line width Li should preferably satisfy the conditions of:

$$\text{Max}(Li)/1.15 < Ave(Li) < \text{Min}(Li)/0.85. \tag{1}$$

Irregularities in the width of one-dots lines at image portions corresponding to different partial scanning portions causes, with great correlation, irregularities in image concentration and resolution, resulting in image deterioration. The difference in image concentration at a position spatially removed from the rear the center of PS1 and PS2(i.e., a position removed 30 mm or more) will show concentration irregularities when the difference in concentration is 7% or more relative to the average concentration of the image, and the concentration irregularities become markedly conspicuous in sensory evaluations when the difference in concentration is 15% or greater.

On the other hand, there is a linear correlation between the square root of the line width and the concentration, and while irregularities in line width relative to the average width may be permissible to around 32% from the perspective of image concentration, the irregularities in line width relative to the average width must be kept to 15% or less when the irregularities in resolution over the entire image area and irregularities equivalent to ±7% in image concentration difference are taken into consideration.

That is, departing from the range of the condition (1) (wherein the maximum line width Max(Li) is smaller than a 15% increase to the average line width Ave (Li), and the minimum line width Min(Li) is greater than a 15% decrease to the average line width) makes irregularities in image concentration conspicuous, and irregularities in resolution also suddenly become marked.

As described above, there is a need to reduce the concentration irregularities to be 15% or less relative to the average concentration at spatially removed areas (image portions corresponding to the center portions of the partials scanning portions PS1 and PS2).

Concentration irregularities are generally proportionate to √(line width)×{(line concentration)^(⅕)}. The line concentration D is defined as $D = \log_{10}(1/Rmin)$, using the minimum reflectance Rmin described above with reference to FIG. 3.

Accordingly, near the center portion of the $i^{th}$ partial scanning portion, with the line width and line concentration of a one-dot line written and formed by a corresponding light flux as Li and Di (wherein i=1, 2) respectively, in the event that the average value Ave{√(Li)×Di^(⅕)}, maximum value Max{√(Li)×Di^(⅕)}, and minimum value Min {√(Li)×Di^(⅕)}, of the computation value √(Li)×Di^(⅕) satisfy the conditions of:

$$\text{Max}\{\sqrt{(Li)} \times Di\hat{}(\tfrac{1}{5})\}/1.15 < Ave\{\sqrt{(Li)} \times Di\hat{}(\tfrac{1}{5})\} < \text{Min}\{\sqrt{(Li)} \times Di\hat{}(\tfrac{1}{5})\}/0.85. \tag{2}$$

then a good image wherein inconspicuous irregularities in concentration is obtained, but departing from the range of the condition (2) suddenly makes the irregularities in concentration conspicuous.

Further, more preferably, $$0.93 \times Ave\{\sqrt{(Li)} \times Di\hat{}(\tfrac{1}{5})\} < \text{Min}\{\sqrt{(Li)} \times Di\hat{}(\tfrac{1}{5})\}$$

and $$\text{Max}\{\sqrt{(Li)} \times Di\hat{}(\tfrac{1}{5})\} < 1.07 \times Ave\{\sqrt{(Li)} \times Di\hat{}(\tfrac{1}{5})\}$$

that is, $$\text{Max}\{\sqrt{(Li)} \times Di\hat{}(\tfrac{1}{5})\}/1.07 < Ave\{\sqrt{(Li)} \times Di\hat{}(\tfrac{1}{5})\} < \text{Min}\{\sqrt{(Li)} \times Di\hat{}(\tfrac{1}{5})\}/0.93 \tag{2A}$$

should be satisfied.

Now, the one-dot lines formed near the center portion of each partial scanning portion, which are to satisfy the conditions (1), (2),and (2A), may be one-dot lines which are elongated in the main scanning direction, one-dot lines which are elongated in the sub-scanning direction, or one-dot lines which are inclined in the main scanning direction, but it is particularly preferable that the conditions (1), (2),and (2A) are satisfied regarding one-dot lines which are elongated in the main scanning direction and also one-dot lines which are elongated in the sub-scanning direction.

When developing an electrostatic latent image written by optical scanning to obtain an image, irregularities in concentration and differences in resolution are more readily discerned by the human eye near the seam portion of the image portions as compared to the above-described irregularities in concentration and differences in resolution at spatially removed areas. Concentration irregularities begin to be conspicuous when the irregularities in image concentration are 5% or more of the averaging concentration, and are markedly conspicuous when the above irregularities are 10% or greater.

On the other hand, there is a linear correlation between the square root of the line width of the line image and the image concentration, and while irregularities in line width relative to the average width may be permissible to around 21% from the perspective of concentration, the irregularities in line width relative to the average width should preferably be kept to 10% or less when the irregularities in resolution and irregularities equivalent to ±5% in concentration difference are taken into consideration.

That is, with the line width ratio L1/L2 of one-dot lines long in the sub-scanning direction near the seam of the image portions corresponding to the latent image written to the partial scanning portions PS1 and PS2 as the sub-scanning line width ratio KS, the sub-scanning line width ratio KS preferably satisfies the condition of:

$$0.9 < KS < 1.1. \tag{3}$$

Departing from the range of the condition (3) results in irregularities in image concentration at the seam portion conspicuous, and irregularities in resolution also suddenly become conspicuous.

If the line width of the one-dot lines elongated in the main scanning direction, written to the partial scanning portions PS1 and PS2, and developed becomes irregular near the seam of the image, then a phenomena occurs wherein the line width of the same line synthesized by the one-dot lines differs, making the seam even more conspicuous.

Accordingly, with regard to the main scanning direction, concentration irregularities and resolution irregularities are reduced by applying conditions even more restrictive than the above condition (3), wherein the irregularities of the main scanning line width ratio KM, which is the line width ratio L1/L2, relative to the average line width, of the one-dot lines which are elongated in the main scanning direction near the seam of the image portions corresponding to the latent image written to the partial scanning portions PS1 and PS2, are kept to 7% or less, i.e., wherein the main-scanning line width ratio KM satisfies the conditions of:

$$0.93 < KM < 1.07 \tag{4}$$

thereby yielding an image which is more appealing to the human eye. Satisfying both the conditions (3) and (4) is a more prefer embodiment of the present invention.

As described above, the irregularities in image concentration relative to the average image concentration should preferably be kept to 10% or less near the seam portion.

As described above, concentration irregularities are generally proportionate to √(line width)×{(line concentration)^(⅕), so that in order to make the seam between the images of each partial scanning portion less conspicuous, the computation amount √(KS)×HS^(⅕) of the above-described KS and the line concentration ratio HS (the line concentration ratio D1/D2 between the line concentrations D1 and D2 of one-dot lines long in the sub-scanning direction and formed near the seam portion of the image portion corresponding to the partial scanning portions PS1 and PS2) preferably satisfies the conditions of:

$$0.9 < \sqrt{(KS)} \times HS\hat{}(⅕) < 1.1. \tag{5}$$

Satisfying the condition (5) yields an image with few irregularities in image concentration, and yields an inconspicuous seam. Departing from the range of the condition (5) makes irregularities in image concentration suddenly conspicuous.

In the event that the line width and line concentration of the one-dot lines elongated in the main scanning direction become irregular near the seam of the image portion corresponding to the partial scanning portions, a phenomena occurs wherein the line width of the same line differs, making the seam even more conspicuous.

Accordingly, in order to keep the irregularities in line width relative to the average line width to 7% or less, an arrangement wherein the computation amount √(KM)×HM^(⅕) of the main scanning line ratio KM which is the ratio L1/L2 of the line width of the one-dot lines long in the main scanning direction and formed near the seam portion of the image portion corresponding to the partial scanning portions PS1 and PS2 and the line concentration ratio HM which is the line concentration ratio D1/D2 satisfies the conditions of:

$$0.93 < \sqrt{(KM)} \times HM\hat{}(⅕) < 1.07. \tag{6}$$

thereby yielding an image wherein concentration irregularities and seams are less conspicuous to the human eye.

Images wherein concentration irregularities and seams are inconspicuous in both the main scanning and sub-scanning directions can be obtained by satisfying both the conditions (5) and (6).

The above has been a description regarding an arrangement wherein the area to be scanned is divided into two partial scanning portions PS1 and PS2, with the light flux from individual light sources 11 and 21 optically scanning the partial scanning portions, but the above description can be applied to arrangements wherein the area to be scanned is divided into three or more partial scanning portions, and in such cases, it is self-evident that the conditions (1) through (6) will be such as described above.

Now, with the optical scanning device according to the present invention, optical scanning conditions are set such that the conditions (1) through (6) are satisfied.

The optical scanning conditions are set for each partial scanning portion, but the above-described conditions are all conditions set with reference to a one-dot line, and the line width and line concentration of one-dot lines are basically determined by the above-described latent image diameter. Accordingly, controlling the latent image diameter so as to reduce the difference in latent image diameter of single dots formed on the partial scanning portions allows the conditions (1) through (6) to be satisfied.

Controlling the latent image diameter can be realized by adjusting the light-emitting amount of the light sources, adjusting the driving duty ratio of the light sources, or adjusting the openings of the apertures for performing beam forming for each of the light fluxes from the light sources.

Of course, combining two or more of adjustment of light-emitting amount, adjustment of the driving duty ratio, and adjustment of the openings of the apertures, for the light sources, allows the latent image diameter to be adjusted with greater precision.

For example, applying one or more of adjustment of light-emitting amount, adjustment of the driving duty ratio, and adjustment of the openings of the apertures, to any light spot forming a latent image having potential distribution such as shown in FIGS. 2C or 2D allows a potential distribution such as shown in FIG. 2E to be obtained. With the case of the above-described embodiment, this can be carried out by taking the light spot from the light source 11 for example as the reference, and adjusting the light-emitting amount and duty ratio for the light 21 such that the light spot formed by the light flux from the light source 21 forms a dot latent image the same as the light spot according to the light source 11.

Adjusting the light emitting amount allows the latent image diameter to be changed in the same way in the main scanning direction and the sub-scanning direction, and adjusting the duty ratio primarily allows the latent image diameter in the main scanning direction to be changed. Accordingly, combining adjusting of light-emitting amount and adjusting of the duty ratio allows the latent image diameter in the main scanning and sub-scanning directions to be adjusted. Also, adjusting the diameter of the opening of the aperture allows the latent image diameter to be independently adjusted in the main scanning direction and the sub-scanning direction, so combining adjusting of the diameter of the opening of the aperture with the above adjustments enables an even more precise adjustment to be made.

Note that irregularities in dot diameter can occur not only at the point of actual optical scanning but also in the processes for developing the formed electrostatic latent image, the process of transferring, and the process of fixing, so that the dot diameters in each partial scanning portion can be made uniform, including the irregularities occurring in these processes, as well.

Also, the line width Li and line concentration Di of the one-dot line described above have been described with reference to one one-dot line, but an arrangement may be made wherein the average value of the line width and line concentration of multiple one-dot lines formed at image portions corresponding to the partial scanning portions or one-dot lines formed repeatedly at the same portion, are used.

Figure 4:
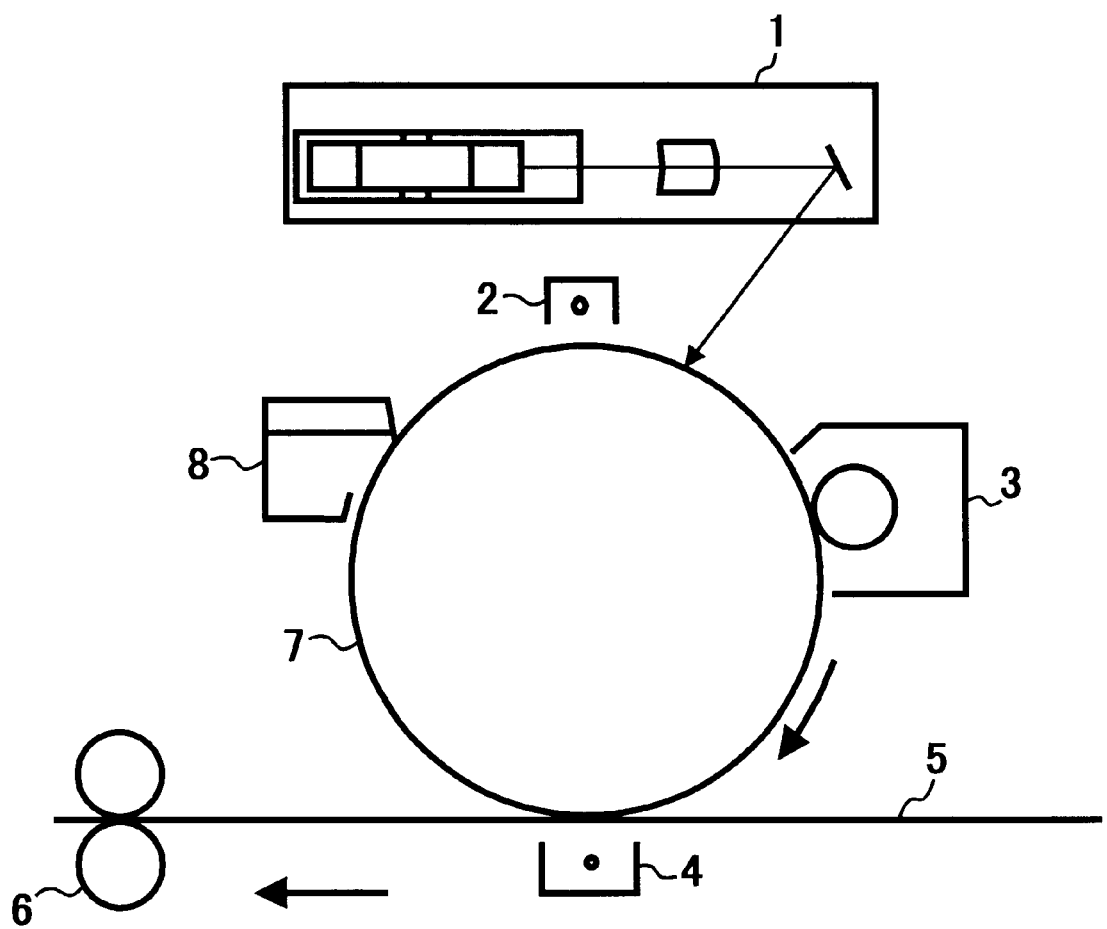
FIG. 4 is a diagram depicting an embodiment of the image forming apparatus.

An image forming apparatus according to a preferred embodiment of the present invention is schematically shown in FIG. 4.

This image forming apparatus is a light beam printer. The photo-electroconductive photosensitive member 7 is a cylindrical article as described with reference to FIG. 1, capable of rotating at least in a clockwise direction, with a charging device 2 (a corona charger is shown in FIG. 4, but a contact type charger such as a charging roller or charging brush may be used as well), a developing device 3, a transfer device 4 (a corona charging device is shown in FIG. 4, but a contact type article such as a transfer roller or the like may be used as well), and a cleaner 8 provided around the photosensitive member 7.

Also, the optical scanning device 1 described with the embodiment with reference to FIG. 1 is provided so as to carry out image exposure by optically scanning the photosensitive member 7 between the charging device 2 and the developing device 3.

At the time of image forming, the photosensitive member 7 is uniformly charged by the charging device 2 while rotating in the direction indicated by the arrow at a constant speed. Following which, optical scanning is performed by the optical scanning device 1 and an electrostatic latent image is formed. The electrostatic latent image is a so-called negative image, with the portions to become the image having been exposed.

The formed electrostatic latent image is inversely developed by a magnetic brush of the developing device 3, developed as a toner image, and the toner image thus obtained is transferred onto a sheet-shaped recording medium 5 such as transfer paper or the like by the transfer device 4, fixed onto the sheet-shaped recording medium 5 by the fixing device 6, and discharged out from the apparatus.

The photosensitive member 7 is cleaned by the cleaner 8 following transferring the toner image, thereby removing residual toner and paper dust.

The transfer of the toner image may be performed using an intermediate transfer medium such as an intermediate transfer belt or the like.

Figure 5:
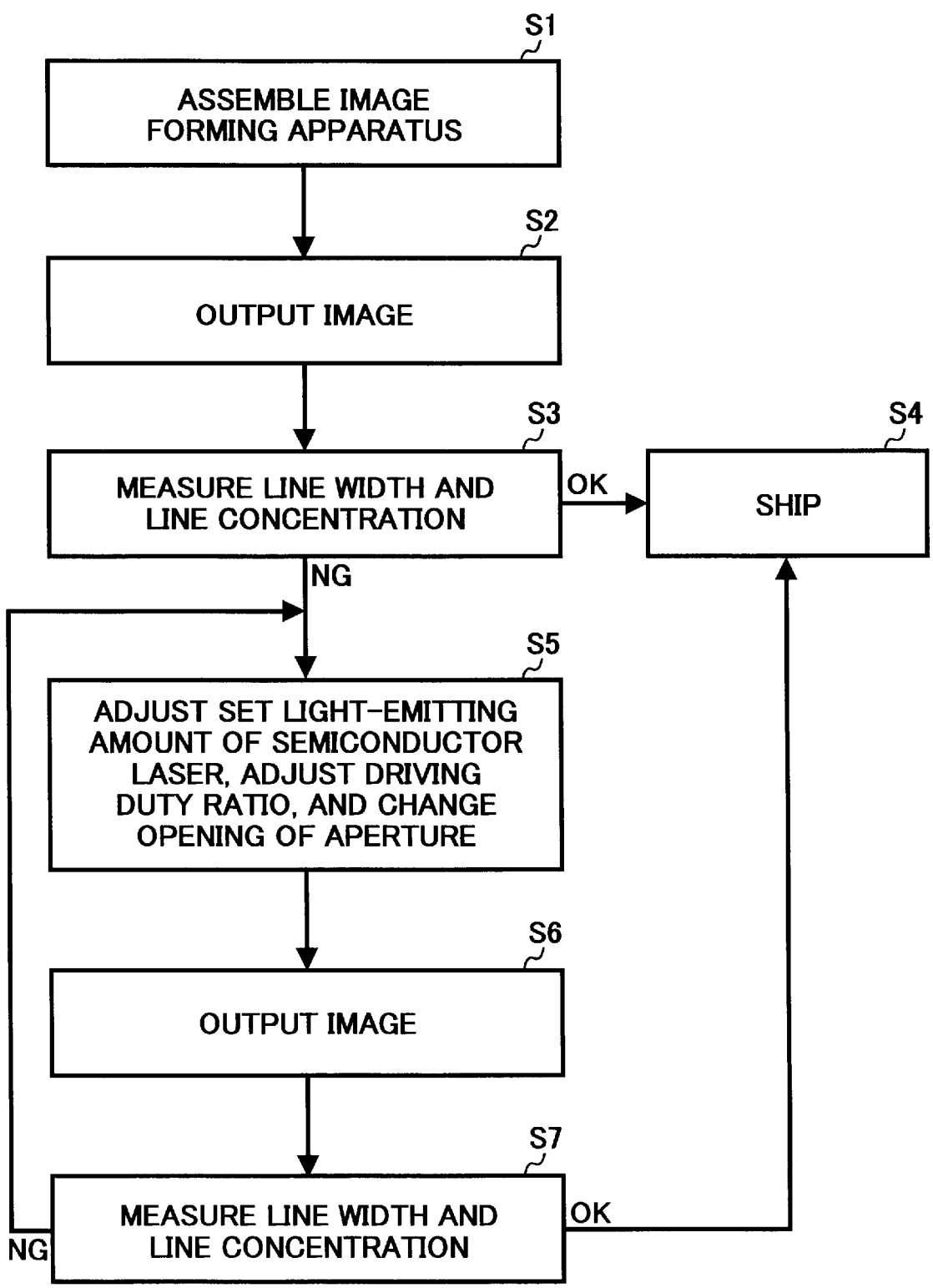
FIG. 5 is a flowchart illustrating the process for manufacturing the image forming apparatus.

FIG. 5 illustrates a flowchart of the manufacturing process for the image forming apparatus.

First, the image forming apparatus is assembled (step S1). Next, the assembled image forming apparatus is actually operated, and image output is performed (step S2). The line width and line concentration of the above-described one-dot line is measured for the image thus output and whether or not the above conditions are satisfied is checked (step S3), and in the event that the above conditions are satisfied (acceptable), the image forming apparatus is shipped, having passed the test (step S4). When conditions are not satisfied and irregularities in concentration or irregularities in resolution are conspicuous (unacceptable), at least one operation is performed of the above-described: 1) adjusting of the set light amount of the light source (affecting adjustment of the line width and line concentration of a one-dot line long in the main scanning direction and a one-dot line long in the sub-scanning direction, in the same way), 2) changing of the driving duty of the light source (particularly affecting adjustment of the line width and line concentration of a one-dot line long in the main scanning direction), and 3) changing the diameter of the opening of the aperture (capable of independently controlling the line width and line concentration of a one-dot line long in the main scanning direction and a one-dot line long in the sub-scanning direction) (step S5), following which image output is performed (step S6). The line width and line concentration of the one-dot line is measured and whether or not the above conditions are satisfied is checked (step S7). In the event that the conditions are satisfied (acceptable), the image forming apparatus ready to be shipped, having passed the test (step S4), but in the event that the conditions are not satisfied and irregularities in concentration or irregularities in resolution are conspicuous (unacceptable), the above steps S5 through S7 are repeated until the image forming apparatus can be shipped.

The optical scanning device according to the present embodiment shown in FIG. 1 divides an area to be scanned on a surface to be scanned 7 into n (wherein n=2) partial scanning portions PS1 and PS2 in the longitudinal direction and uses n light sources 11 and 21 corresponding to the partial scanning portions on a one-to-one basis to optically scan the partial scanning portions PS1 and PS2 corresponding to the light fluxes from the n light sources 11 and 21, thereby synthetically optically scanning the area to be scanned. The optical scanning device includes the deflecting devices 15 and 25 for deflecting light fluxes from the n light sources, and the scan imaging optical 16 and 26 for converging light fluxes deflected by the deflecting devices 15 and 25 toward the surface to be scanned 7, so that each light flux forms an optical spot on each of the partial scanning portions PS1 and PS2 to be optically scanned by each light flux, wherein with the line width of one-dot lines formed by writing with the corresponding light flux near the center portion of the $i^{th}$ partial scanning portion as Li (wherein i=1 through n), the optical scanning conditions are set so that the average value Ave (Li), maximum value Max(Li), and minimum value Min (Li), of the line widths Li satisfy the conditions of:

$$\text{Max}(Li)/1.15 < \text{Ave}(Li) < \text{Min}(Li)/0.85. \tag{1}$$

Further, with the line width and line concentration of one-dot lines formed by writing with the corresponding light flux near the center portion of the $i^{th}$ partial scanning portions PS1 and PS2 as Li and Di respectively (wherein i=1 through n), the optical scanning conditions are set so that the average value Ave$\{\sqrt(Li) \times Di\hat{}(\frac{1}{3})\}$, maximum value Max$\{\sqrt(Li) \times Di\hat{}(\frac{1}{3})\}$, and minimum value Min $\{\sqrt(Li) \times Di\hat{}(\frac{1}{3})\}$, of the computation value $\sqrt(Li) \times Di\hat{}(\frac{1}{3})$ satisfy the conditions of:

$$\text{Max}\{\sqrt(Li) \times Di\hat{}(\frac{1}{3})\}/1.15 < \text{Ave}\{\sqrt(Li) \times Di\hat{}(\frac{1}{3})\} < \text{Min}\{\sqrt(Li) \times Di\hat{}(\frac{1}{3})\}/0.85, \tag{2}$$

or even more preferably $$\text{Max}\{\sqrt(Li) \times Di\hat{}(\frac{1}{3})\}/1.07 < \text{Ave}\{\sqrt(Li) \times Di\hat{}(\frac{1}{3})\} < \text{Min}\{\sqrt(Li) \times Di\hat{}(\frac{1}{3})\}/0.93. \tag{2A}$$

Now, the one-dot lines formed near the center portion of the $i^{th}$ partial scanning portions PS1 and PS2 by writing with the corresponding light flux may be one-dot lines which are long in the main scanning direction, one-dot lines which are long in the sub-scanning direction, or one-dot lines which are inclined in the main scanning direction, but the conditions (1) through (2A) are preferably satisfied by one-dot lines which are elongated in the main scanning direction and one-dot lines which are elongated in the sub-scanning direction, formed by writing with the corresponding light flux near the center portion of the $i^{th}$ partial scanning portion PS1 and PS2.

Further, with the line width ratio $L_i/L_{i+1}$ (wherein i=1 through n−1) of one-dot lines formed by writing with the corresponding light flux long in the sub-scanning direction near the seam between the partial scanning portion PS1 and the partial scanning portion PS2 as the sub-scanning line width ratio KS, the optical scanning conditions are set such that this sub-scanning line width ratio KS satisfies the conditions of:

$$0.9 < KS < 1.1, \tag{3}$$

and with the line width ratio $L_i/L_{i+1}$ (wherein i=1 through n−1) of one-dot lines formed by writing with the corresponding light flux elongated in the main scanning direction near the seam between the partial scanning portion PS1 and the partial scanning portion PS2 as the main scanning line width ratio KM, the optical scanning conditions are set such that this main scanning line width ratio KM satisfies the conditions of:

$$0.93 < KM < 1.07. \tag{4}$$

In addition to the conditions (3), the optical scanning conditions are preferably set such that this main scanning line width ratio KM satisfies the conditions of:

$$0.93 < KM < 1.07. \tag{4}$$

Further, with the line width ratio $L_i/L_{i+1}$ (wherein i=1 through n−1) of one-dot lines formed by writing with the corresponding light flux long in the sub-scanning direction near the seam between the partial scanning portion PS1 and the partial scanning portion PS2 as the sub-scanning line width ratio KS, and the line concentration ratio $D_i/D_{i+1}$ as the line concentration ratio HS, the optical scanning conditions are preferably set such that the computation amount $\sqrt(KS) \times HS\hat{}(\frac{1}{3})$ satisfies the conditions of:

$$0.9 < \sqrt(KS) \times HS\hat{}(\frac{1}{3}) < 1.1, \tag{5}$$

and further, with the line width ratio $L_i/L_{i+1}$ (wherein i=1 through n−1) of one-dot lines formed by writing with the corresponding light flux long in the main scanning direction near the seam between the partial scanning portion PS1 and the partial scanning portion PS2 as the main scanning line width ratio KM, and the line concentration ratio $D_i/D_{i+1}$ as the line concentration ratio HM, the optical scanning conditions are even more preferably set such that the computation amount $\sqrt(KM) \times HM\hat{}(\frac{1}{3})$ satisfies the conditions of:

$$0.93 < \sqrt(KM) \times HM\hat{}(\frac{1}{3}) < 1.07. \tag{6}$$

Satisfying both the conditions (5) and (6) is even more preferred.

The light-emitting amount of the n light sources 11 and 21 may be made independently adjustable, thereby adjusting the light-emitting amount, the driving duty ratio of the n light sources 11 and 21 may be made independently adjustable, thereby adjusting driving duty ratio, and the openings of the n apertures 13 and 23 for performing beam forming for each of the light fluxes from the n light sources 11 and 21 may each be independently set. Thus, the optical conditions can be set so as to satisfy the above conditions.

With the optical scanning device shown in FIG. 1 as an embodiment, the number n of light sources is two, the deflecting device is configured of two optical deflectors 15 and 25 for individually deflecting light fluxes from the light sources 11 and 21, and the scan imaging optical device is configured with two image scanners 16 and 26 for individually converting light fluxes from the light sources 11 and 21 toward areas to be scanned.

Also, the optical scanning device has photo-receptors 17, 27, and 28 at the starting side and ending side of the scan image optical devices for photo-receiving deflected light fluxes, at each partial scanning portion PS1 and PS2. One photo-receptor 27 is placed between adjacent partial scanning portions PS1 and PS2, with the photo-receptor 27 photo-receiving deflected light fluxes at the ending side of the one partial scanning portion PS1 and also photo-receiving deflected light fluxes at the starting side of the other partial scanning portion PS2.

Accordingly, using the optical scanning device according to the embodiment shown in FIG. 1 enables execution of an optical scanning method which divides an area to be scanned into n (wherein n≧2) partial scanning portions PS1 and PS2 in the longitudinal direction and uses n light sources 11 and 21 corresponding to the partial scanning portions on a one-to-one basis to optically scan the partial scanning portions corresponding to the light fluxes from the n light sources, thereby synthetically optically scanning the area to be scanned. Further, a driving clock for each of the light sources 11 and 21 corresponding to the partial scanning portions PS1 and PS2 is adjusted based on difference in detection time of the photo-receptors 17, 27, and 28 at the optical scanning starting side and optical scanning ending side of each of the partial scanning portions PS1 and PS2.

Also, the image forming apparatus according to the embodiment shown in FIG. 4 forms an electrostatic latent image by performing optical scanning of a photo-electroconducting photosensitive member 7 with the optical scanning device 1, and developing the electrostatic latent image as a toner image to obtain an image, wherein the optical scanning device 1 of any of the arrangements described above may be used as the optical scanning device for performing optical scanning of the photosensitive member.

Thus, according to the present invention, a new optical scanning device, optical scanning method, and image forming apparatus, can be provided.

The optical scanning device and optical scanning method according to the present invention is capable of effectively reducing the irregularities in concentration and irregularities in resolution which occur with conventional divided scanning methods, while maintaining the aforementioned advantages of the divided scanning method, thereby carrying out optical scanning which produces images appealing to the human eye. Accordingly, the image forming apparatus according to the present invention can carry out suitable image forming, by using such an optical scanning device.

Numerous additional modifications and variations of the present invention are possible in light of the above teachings. It is therefore to be understood that within the scope of the appended claims, the present invention may practiced otherwise than as specifically described herein.

The present application claims priority and contains subject matter related to Japanese Patent Application No. 2000-222190 filed in the Japanese Patent Office on Jul. 24, 2000, and the entire contents of which are hereby incorporated by reference.

What is claimed is:

1. An optical scanning device which divides an area to be scanned on a surface to be scanned into n (wherein $n \geq 2$) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width Li, where i=1 through n, of one-dot lines formed by scanning with a light flux near a center portion of an $i^{th}$ partial scanning portion of said n partial scanning portions is determined by an optical scanning condition set such that an average value Ave (Li), a maximum value Max(Li), and a minimum value Min (Li), of the line width Li of said one-dot lines satisfy a line width condition of:

$$\mathrm{Max}(Li)/1.15 < \mathrm{Ave}(Li) < \mathrm{Min}(Li)/0.85.$$

2. An optical scanning device which divides an area to be scanned on a surface to be scanned into n (wherein $n \geq 2$) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width Li and a line concentration Di, where i=1 though n, of one-dot lines formed by scanning with a light flux near a center portion of an $i^{th}$ partial scanning portion of said n partial scanning portions is determined by a first optical scanning condition set such that an average value Ave{√(Li)×Di^(⅕)}, a maximum value Max{√(Li)×Di^(⅕)}, and a minimum value Min {√(Li)×Di^(⅕)}, of computation values √(Li)×Di^(⅕) of said one-dot lines satisfy a first condition of:

$$\mathrm{Max}\{\surd(Li) \times Di\hat{\ }(\tfrac{1}{5})\}/1.15 < \mathrm{Ave}\{\surd(Li) \times Di\hat{\ }(\tfrac{1}{5})\} < \mathrm{Min}\{\surd(Li) \times Di\hat{\ }(\tfrac{1}{5})\}/0.85.$$

3. The optical scanning device according to claim 2, wherein the line width Li and the line concentration Di of one-dot lines is determined by a second optical scanning condition set such that the average value Ave{√(Li)×Di^(⅕)}, the maximum value Max{√(Li)×Di^(⅕)}, and the minimum value Min {√(Li)×Di^(⅕)}, of the computation value √(Li)×Di^(⅕) satisfy a second condition of:

$$\mathrm{Max}\{\surd(Li) \times Di\hat{\ }(\tfrac{1}{5})\}/1.07 < \mathrm{Ave}\{\surd(Li) \times Di\hat{\ }(\tfrac{1}{5})\} < \mathrm{Min}\{\surd(Li) \times Di\hat{\ }(\tfrac{1}{5})\}/0.93.$$

4. The optical scanning device according to claim 1, wherein, near the center portion of the $i^{th}$ partial scanning portion, each of said one-dot lines is elongated in a main scanning direction.

5. The optical scanning device according to claim 2, wherein, near the center portion of the $i^{th}$ partial scanning portion, each of said one-dot lines is elongated in a main scanning direction.

6. The optical scanning device according to claim 1, wherein, near the center portion of the $i^{th}$ partial scanning portion, each of said one-dot lines is elongated in a sub-scanning direction.

7. The optical scanning device according to claim 2, wherein, near the center portion of the $i^{th}$ partial scanning portion, each one-dot lines is elongated in a sub-scanning direction.

8. The optical scanning device according to claim 1, wherein, near the center portion of the $i^{th}$ partial scanning portion, each of said one-dot lines is inclined in the main scanning direction.

9. The optical scanning device according to claim 2, wherein, near the center portion of the $i^{th}$ partial scanning portion, each of said one-dot lines is inclined in the main scanning direction.

10. The optical scanning device according to claim 1, wherein, near the center portion of the $i^{th}$ partial scanning portion, the line width condition is satisfied by one-dot lines which are elongated in a main scanning direction and by one-dot lines which are elongated in a sub-scanning direction.

11. The optical scanning device according to claim 2, wherein, near the center portion of the $i^{th}$ partial scanning portion, the first condition is satisfied by one-dot lines which are elongated in a main scanning direction and by one-dot lines which are elongated in a sub-scanning direction.

12. The optical scanning device according to claim 3, wherein, near the center portion of the $i^{th}$ partial scanning portion, the second condition is satisfied by one-dot lines which are elongated in a main scanning direction and by one-dot lines which are elongated in a sub-scanning direction.

13. An optical scanning device which divides an area to be scanned on a surface to be scanned into n (wherein n≧2) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a first line width ratio $L_i/L_{i+1}$, where i=1 through n−1, of one-dot lines formed by scanning with a light flux elongated in a sub-scanning direction near a seam between an $i^{th}$ partial scanning portion and an i+1$^{th}$ partial scanning portion, denoted as a sub-scanning line width ratio KS, is determined by a first optical scanning condition set such that the sub-scanning line width ratio KS satisfies a first ratio condition of:

$$0.9 < KS < 1.1.$$

14. An optical scanning device which divides an area to be scanned on a surface to be scanned into n (wherein n≧2) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a main scanning direction near a seam between an $i^{th}$ partial scanning portion and an i+1$^{th}$ partial scanning portion, denoted as a main scanning line width ratio KM, is determined by an optical scanning condition set such that the main scanning line width ratio KM satisfies a ratio condition of:

$$0.93 < KM < 1.07.$$

15. The optical scanning device according to claim 13, whereby a second line width ratio $L_i/L_{i+1}$ of one-dot lines formed by scanning with a light flux elongated in a main scanning direction near the seam between the $i^{th}$ partial scanning portion and the i+1$^{th}$ partial scanning portion, denoted as the main scanning line width ratio KM, is determined by a second optical scanning condition set such that the main scanning line width ratio KM satisfies a second ratio condition of:

$$0.93 < KM < 1.07.$$

16. An optical scanning device which divides an area to be scanned on a surface to be scanned into n (wherein n≧2) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a first line width ratio $L_i/L_{i+1}$, where i=1 through n−1, of one-dot lines formed by scanning with a light flux elongated in a sub-scanning direction near a seam between an $i^{th}$ partial scanning portion and an i+1$^{th}$ partial scanning portion, denoted as a sub-scanning line width ratio KS, and a first line concentration ratio $D_i/D_{i+1}$, denoted as a line concentration ratio HS, are determined by a first optical scanning condition set such that a computation amount $\sqrt{(KS) \times HS\hat{}(1/5)}$ of said one-dot lines satisfies a first condition of:

$$0.9 < \sqrt{(KS) \times HS\hat{}(1/5)} < 1.1.$$

17. An optical scanning device which divides an area to be scanned on a surface to be scanned into n (wherein n≧2) partial scanning portions in a longitudinal direction thereof, comprising:

n light sources respectively corresponding to said n partial scanning portions and configured to optically scan said n partial scanning portions with respective light fluxes from said n light sources thereby to scan said areas;

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a main scanning direction near a seam between an $i^{th}$ partial scanning portion and an i+1$^{th}$ partial scanning portion, denoted as a main scanning line width ratio KM, and a line concentration ratio $D_i/D_{i+1}$, denoted as a line concentration ratio HM, are determined by an optical scanning condition set such that a computation amount $\sqrt{(KM) \times HM\hat{}(1/5)}$ of said one-dot lines satisfies a condition of:

$$0.93 < \sqrt{(KM) \times HM\hat{}(1/5)} < 1.07.$$

18. The optical scanning device according to claim 16, whereby a second line width ratio $L_i/L_{i+1}$ of one-dot lines formed by scanning with a light flux elongated in a main scanning direction near the seam between the $i^{th}$ partial scanning portion and the i+1$^{th}$ partial scanning portion, denoted as a main scanning line width ratio KM, and a second line concentration ratio $D_i/D_{i+1}$, denoted as the line concentration ratio HM, are determined by a second optical scanning condition set such that a computation amount √(KM)×HM^(⅕) satisfies a second condition of:

$$0.93 < \sqrt{(KM)} \times HM^{(1/5)} < 1.07.$$

19. The optical scanning device according to claim 1, wherein the n light sources are configured such that an intensity of light from each of said n light sources can be adjusted independently.

20. The optical scanning device according to claim 2, wherein the n light sources are configured such that an intensity of light from each of said n light sources can be adjusted independently.

21. The optical scanning device according to claim 13, wherein the n light sources are configured such that an intensity of light from each of said n light sources can be adjusted independently.

22. The optical scanning device according to claim 14, wherein the n light sources are configured such that an intensity of light from each of said n light sources can be adjusted independently.

23. The optical scanning device according to claim 16, wherein the n light sources are configured such that an intensity of light from each of said n light sources can be adjusted independently.

24. The optical scanning device according to claim 17, wherein the n light sources are configured such that an intensity of light from each of said n light sources can be adjusted independently.

25. The optical scanning device according to claim 1, wherein the n light sources are configured such that a driving duty ratio for each of said n light sources can be set independently.

26. The optical scanning device according to claim 2, wherein the n light sources are configured such that a driving duty ratio for each of said n light sources can be set independently.

27. The optical scanning device according to claim 13, wherein the n light sources are configured such that a driving duty ratio for each of said n light sources can be set independently.

28. The optical scanning device according to claim 14, wherein the n light sources are configured such that a driving duty ratio for each of said n light sources can be set independently.

29. The optical scanning device according to claim 16, wherein the n light sources are configured such that a driving duty ratio for each of said n light sources can be set independently.

30. The optical scanning device according to claim 17 wherein the n light sources are configured such that a driving duty ratio for each of said n light sources can be set independently.

31. The optical scanning device according to claim 1, further comprising:
    n number of apertures configured to beam form each of said respective light fluxes from said light sources,
    wherein said n number of apertures include openings configured to be set independently.

32. The optical scanning device according to claim 2, further comprising:
    n number of apertures configured to beam form each of said respective light fluxes from said light sources,
    wherein said n number of apertures include openings configured to be set independently.

33. The optical scanning device according to claim 13, further comprising:
    n number of apertures configured to beam form each of said respective light fluxes from said a light sources,
    wherein the openings of said n number of apertures include openings configured to be set independently.

34. The optical scanning device according to claim 14, further comprising:
    n number of apertures configured to beam form each of said respective light fluxes from said n light sources,
    wherein said n number of apertures include openings configured to be set independently.

35. The optical scanning device according to claim 16, further comprising:
    n number of apertures configured to beam form each of said respective light fluxes from said light sources,
    wherein said n number of apertures include openings configured to be set independently.

36. The optical scanning device according to claim 17, further comprising:
    n number of apertures configured to beam form each of said respective light fluxes from said light sources,
    wherein said n number of apertures include openings configured to be configured to be set independently.

37. The optical scanning device according to claim 1, wherein the number n of light sources is two.

38. The optical scanning device according to claim 2, wherein the number n of light sources is two.

39. The optical scanning device according to claim 13, wherein the number n of light sources is two.

40. The optical scanning device according to claim 14, wherein the number n of light sources is two.

41. The optical scanning device according to claim 16, wherein the number n of light sources is two.

42. The optical scanning device according to claim 17, wherein the number n of light sources is two.

43. The optical scanning device according claim 37, wherein the deflecting device includes two optical deflectors configured to individually deflect the respective light fluxes.

44. The optical scanning device according claim 38, wherein the deflecting device includes two optical deflectors configured to individually deflect the respective light fluxes.

45. The optical scanning device according claim 39, wherein the deflecting device includes two optical deflectors configured to individually deflect the respective light fluxes.

46. The optical scanning device according claim 40, wherein the deflecting device includes two optical deflectors configured to individually deflect the respective light fluxes.

47. The optical scanning device according claim 41, wherein the deflecting device includes two optical deflectors configured to individually deflect the respective light fluxes.

48. The optical scanning device according claim 42, wherein the deflecting device includes two optical deflectors configured to individually deflect the respective light fluxes.

49. The optical scanning device according to claim 37, wherein the scan imaging optical device includes two image scanners configured to individually converge the respective light fluxes from said light sources toward one of said areas.

50. The optical scanning device according to claim 38, wherein the scan imaging optical device includes two imaging scanners configured to individually converge the respective light fluxes from said light sources toward one of said areas.

51. The optical scanning device according to claim 39, wherein the scan imaging optical device includes two image scanners configured to individually converge the respective light fluxes from said light sources toward one of said areas.

52. The optical scanning device according to claim 40, wherein the scan imaging optical device includes two image configured to individually converge the respective light fluxes from said light sources toward one of said areas.

53. The optical scanning device according to claim 41, wherein the scan imaging optical device includes two image scanners configured to individually converge the respective light fluxes from said light sources toward one of said areas.

54. The optical scanning device according to claim 42, wherein the scan imaging optical device includes two image scanners configured to individually converge the respective light fluxes from said light sources toward one of said areas.

55. The optical scanning device according to claim 1, further comprising:
a photo-receptor at a starting side and a photo-receptor at an ending side of the scan imaging optical device, configured to photo-receive the deflected light fluxes for each of said n partial scanning portions.

56. The optical scanning device according to claim 2, further comprising:
a photo-receptor at a starting side and a photo-receptor at an ending side of the scan imaging optical device, configured to photo-receive the deflected light fluxes for each of said n partial scanning portions.

57. The optical scanning device according to claim 13, further comprising:
a photo-receptor at a starting side and a photo-receptor at an ending side of the scan imaging optical device, configured to photo-receive the deflected light fluxes for each of said n partial scanning portions.

58. The optical scanning device according to claim 14, further comprising:
a photo-receptor at a starting side and a photo-receptor at an ending side of the scan imaging optical device, configured to photo-receive the deflected light fluxes for each of said n partial scanning portions.

59. The optical scanning device according to claim 16, further comprising:
a photo-receptor at a starting side and a photo-receptor at an ending side of the scan imaging optical device, configured to photo-receive the deflected light fluxes for each of said n partial scanning portions.

60. The optical scanning device according to claim 17, further comprising:
a photo-receptor at a starting side and a photo-receptor at an ending side of the scan imaging optical device, configured to photo-receive the deflected light fluxes for each of said n partial scanning portions.

61. The optical scanning device according to claim 55, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

62. The optical scanning device according to claim 56, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

63. The optical scanning device according to claim 57, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

64. The optical scanning device according to claim 58, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

65. The optical scanning device according to claim 59, wherein one of said photo-receptors is placed between adjacent partial scanning portions and is configured to photo-receive deflected light flux at an ending side of one partial scanning portion of said adjacent partial scanning portions and to photo-receive of deflected light flux at a starting side of another partial scanning portion of said adjacent partial scanning portions.

66. The optical scanning device according to claim 60, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

67. An image forming apparatus, comprising:
a photosensitive member configured to form a latent image thereupon;
an optical scanning device configured to optically scan the photosensitive member to form the latent image; and
a developing device configured to develop the latent image into a toner image and to thereby obtain an image;
wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:
at least one deflecting device configured to deflect the respective light fluxes; and
at least one scanning imaging optical device configured to converge light fluxes deflected by said deflecting device toward said surface to be scanned, such that each light flux from said light sources forms an optical spot on a corresponding partial scanning portion of said n partial scanning portions,
wherein a line width Li, where i=1 through n, of one-dot lines formed by scanning with a light flux near a center portion of an $i^{th}$ partial scanning portion of said n partial scanning portions is determined by an optical scanning condition set such that an average value Ave(Li), a maximum value Max(Li), and a minimum value Min (Li), of the line width Li of said one-dot lines satisfy a line width condition of:

$$\mathrm{Max}(Li)/1.15 < Ave(Li) < \mathrm{Min}(Li)/0.85.$$

68. An image forming apparatus, comprising:
  a photosensitive member configured to form a latent image thereupon;
  an optical scanning device configured to optically scan the photosensitive member to form the latent image; and
  a developing device configured to develop the latent image into a toner image and to thereby obtain an image;
  wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:
    at least one deflecting device configured to deflect the respective light fluxes; and
    at least one scanning imaging optical device configured to converge light fluxes deflected by said deflecting device toward said surface to be scanned, such that each light flux from said light sources forms an optical spot on a corresponding partial scanning portion of said n partial scanning portions,
  wherein a line width and a line concentration Li, where= i=1 through n, of one-dot lines formed by scanning with a light flux near a center portion of an $i^{th}$ partial scanning portion of said n partial scanning portions are determined by a first optical scanning condition set such that an average value Ave{√(Li)×Di^(⅕)}, a maximum value Max{√(Li)×Di^(⅕)}, and a minimum value Min {√(Li)×Di^(⅕)}, of computation values √(Li)×Di^(⅕) of said one-dot lines satisfy a first condition of:

Max{√(Li)×Di^(⅕)}/1.15<Ave{√(Li)×Di^(⅕)}<Min{√(Li)×Di^(⅕)}/0.85.

69. The image forming apparatus according to claim 68, wherein the line width Li and the line concentration Di of one-dot lines is determined by a second optical scanning condition set such that the average value Ave{√(Li)×Di^(⅕)}, the maximum value Max{√(Li)×Di^(⅕)}, and the minimum value Min {√(Li)×Di^(⅕)}, of the computation value √(Li)×Di^(⅕) satisfy a second condition of:

Max{√(Li)×Di^(⅕)}/1.07<Ave{√(Li)×Di^(⅕)}<Min{√(Li)×Di^(⅕)}/0.93.

70. The image forming apparatus according to claim 67, wherein, near the center portion of the $i^{th}$ partial scanning portion, each of said one-dot lines is elongated in a main scanning direction.

71. The image forming apparatus according to claim 68, wherein, near the center portion of the $i^{th}$ partial scanning portion, each of said one-dot lines is elongated in a main scanning direction.

72. The image forming apparatus according to claim 67, wherein, near the center portion of the $i^{th}$ partial scanning portion, each of said one-dot lines is elongated in a sub-scanning direction.

73. The image forming apparatus according to claim 68, wherein, near the center portion of the $i^{th}$ partial scanning portion, each of said one-dot lines is elongated in a sub-scanning direction.

74. The image forming apparatus according to claim 67, wherein, near the center portion of the $i^{th}$ partial scanning portion, each of said one-dot lines is inclined in the main scanning direction.

75. The image forming apparatus according to claim 68, wherein, near the center portion of the $i^{th}$ partial scanning portion, each of said one-dot lines is inclined in the main scanning direction.

76. The image forming apparatus according to claim 67, wherein, near the center portion of the $i^{th}$ partial scanning portion, the line width condition is satisfied by one-dot lines which are elongated in the main scanning direction and by one-dot lines which are elongated in the sub-scanning direction.

77. The image forming apparatus according to claim 68, wherein, near the center portion of the $i^{th}$ partial scanning portion, the first condition is satisfied by one-dot lines which are elongated in the main scanning direction and by one-dot lines which are elongated in the sub-scanning direction.

78. The image forming apparatus according to claim 69, wherein, near the center portion of the $i^{th}$ partial scanning portion, the second condition is satisfied by one-dot lines which are elongated in the main scanning direction and by one-dot lines which are elongated in the sub-scanning direction.

79. An image forming apparatus, comprising:
  a photosensitive member configured to form a latent image thereupon;
  an optical scanning device configured to optically scan the photosensitive member to form the latent image; and
  a developing device configured to develop the latent image into a toner image and to thereby obtain an image;
  wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:
    at least one deflecting device configured to deflect the respective light fluxes; and
    at least one scanning imaging optical device configured to converge light fluxes deflected by said deflecting device toward said surface to be scanned, such that each light flux from said light sources forms an optical spot on a corresponding partial scanning portion of said n partial scanning portions,
  wherein a line width ratio $L_i/L_{i+1}$, where i=1 through n−1, of one-dot lines formed by scanning with a light flux elongated in a sub-scanning direction near a seam between an $i^{th}$ partial scanning portion and an $i+1^{th}$ partial scanning portion, denoted as a sub-scanning line width ratio KS, is determined by a first optical scanning condition set such that the sub-scanning line width ratio KS satisfies a first ratio condition of:

0.9<KS<1.1.

80. An image forming apparatus, comprising:
  a photosensitive member configured to form a latent image thereupon;
  an optical scanning device configured to optically scan the photosensitive member to form the latent image; and
  a developing device configured to develop the latent image into a toner image and to thereby obtain an image;

wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a main scanning direction near a seam between an $i^{th}$ partial scanning portion and an i+1$^{th}$ partial scanning portion, denoted as a main scanning line width ratio KM, is determined by an optical scanning condition set such that the main scanning line width ratio KM satisfies a ratio condition of:

$$0.9 < KM < 1.07.$$

81. The image forming apparatus according to claim 79, whereby a second line width ratio $L_i/L_{i+1}$ of one-dot lines formed by scanning with a light flux elongated in a main scanning direction near the seam between the $i^{th}$ partial scanning portion and the i+1$^{th}$ partial scanning portion, denoted as a main scanning line width ratio KM, is determined by a second optical scanning condition set such that the main scanning line width ratio KM satisfies a second ratio condition of:

$$0.93 < KM < 1.07.$$

82. An image forming apparatus, comprising:

a photosensitive member configured to form a latent image thereupon;

an optical scanning device configured to optically scan the photosensitive member to form the latent image; and a developing device configured to develop the latent image into a toner image and to thereby obtain an image;

wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a first line width ratio $L_i/L_{i+1}$, where i=1 through n−1, of one-dot lines formed by scanning with a light flux elongated in a sub-scanning direction near a seam between an $i^{th}$ partial scanning portion and an i+1$^{th}$ partial scanning portion, denoted as a sub-scanning line width ratio KS, and a first line concentration ratio $D_i/D_{i+1}$, denoted as a line concentration ratio HS, are determined by a first optical scanning condition set such that a computation amount $\sqrt{(KS) \times HS\hat{~}(1/5)}$ of said one-dot lines satisfies a first condition of:

$$0.9 < \sqrt{(KS) \times HS\hat{~}(1/5)} < 1.1.$$

83. An image forming apparatus, comprising:

a photosensitive member configured to form a latent image thereupon;

an optical scanning device configured to optically scan the photosensitive member to form the latent image; and a developing device configured to develop the latent image into a toner image and to thereby obtain an image;

wherein the optical scanning device divides an area to be scanned on a surface to be scanned into n (wherein n≧2) partial scanning portions in a longitudinal direction thereof, and includes n light sources respectively corresponding to said n partial scanning portions and configured to optically scan said n partial scanning portions with respective light fluxes from said n light sources thereby to scan said areas, said optical scanning device, further comprising:

at least one deflecting device configured to deflect the respective light fluxes; and at least one scanning imaging optical device configured to converge light fluxes deflected by said deflecting device toward said surface to be scanned, such that each light flux from said light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a main scanning direction near a seam between an $i^{th}$ partial scanning portion and an i+1$^{th}$ partial scanning portion, denoted as a main scanning line width ratio KM, and a line concentration ratio $D_i/D_{i+1}$, denoted as a line concentration ratio HM, are defined by an optical scanning condition set such that a computation amount $\sqrt{(KM) \times HM\hat{~}(1/5)}$ of said one-dot lines satisfies a condition of:

$$0.93 < \sqrt{(KM) \times HM\hat{~}(1/5)} < 1.07.$$

84. The image forming apparatus according to claim 82, whereby a second line width ratio $L_i/L_{i+1}$ of one-dot lines formed by scanning with a light flux elongated in the main scanning direction near the seam between the $i^{th}$ partial scanning portion and the i+1$^{th}$ partial scanning portion, denoted as a main scanning line width ratio KM, and a second line concentration ratio $D_i/D_{i+1}$, denoted as a line concentration ratio HM, are determined by a second optical scanning condition set such that the computation amount $\sqrt{(KM) \times HM\hat{~}(1/5)}$ satisfies a second condition of:

$$0.93 < \sqrt{(KM) \times HM\hat{~}(1/5)} < 1.07.$$

85. The image forming apparatus according to claim 67, wherein the n light sources are configured such that an intensity of light from each of said n light sources can be adjusted independently.

86. The image forming apparatus according to claim 68 wherein the n light sources are configured such that an intensity of light from each of said n light sources can be adjusted independently.

87. The image forming apparatus according to claim 79, wherein the n light sources are configured such that an intensity of light from each of said n light sources can be adjusted independently.

88. The image forming apparatus according to claim 80, wherein the n light sources are configured such an intensity of light from each of said n light sources can be adjusted independently.

89. The image forming apparatus according to claim 82, wherein the n light sources are configured such an intensity of light from each of said n light sources can be adjusted independently.

90. The image forming apparatus according to claim 83, wherein the n light sources are configured such an intensity of light from each of said n light sources can be adjusted independently.

91. The image forming apparatus according to claim 67, wherein the n light sources are configured such that a driving duty ratio for each of said n light sources can be set independently.

92. The image forming apparatus according to claim 68, wherein the n light sources are configured such that a driving duty ratio for each of said n light sources can be set independently.

93. The image forming apparatus according to claim 79, wherein the n light sources are configured such that a driving duty ratio for each of said n light sources can be set independently.

94. The image forming apparatus according to claim 80, wherein the n light sources are configured such that a driving duty ratio for each of said n light sources can be set independently.

95. The image forming apparatus according to claim 82, wherein the n light sources are configured such that a driving duty ratio for each of said n light sources can be set independently.

96. The image forming apparatus according to claim 83 wherein the n light sources are configured such that a driving duty ratio for each of said n light sources can be set independently.

97. The image forming apparatus according to claim 67, the optical scanning device, further comprising:
n number of apertures configured to beam form each of said light fluxes from said light sources,
wherein said n number of apertures include openings configured to be set independently.

98. The image forming apparatus according to claim 68, wherein the optical scanning device further comprises:
n number of apertures configured to beam form each of said light fluxes from said light sources,
wherein said n number of apertures include openings configured to be set independently.

99. The image forming apparatus according to claim 79, wherein the optical scanning device further comprises:
n number of apertures configured to beam each of said light fluxes from said light sources,
wherein said n number of apertures include openings configured to be set independently.

100. The image forming apparatus according to claim 80, the optical scanning device further comprises:
n number of apertures configured to beam form each of said light fluxes from said light sources,
wherein said n number of apertures include openings configured to be set independently.

101. The image forming apparatus according to claim 82, wherein the optical scanning device further comprises:
n number of apertures configured to beam form each of said light fluxes from said light sources,
wherein said n number of apertures include openings configured to be set independently.

102. The image forming apparatus according to claim 83, wherein the optical scanning device further comprises:
n number of apertures configured to beam each of said light fluxes said light sources,
wherein said n number of apertures include openings configured to be set independently.

103. The image forming apparatus according to claim 67, wherein the number n of light sources is two.

104. The image forming apparatus according to claim 68, wherein the number n of light sources is two.

105. The image forming apparatus according to claim 79, wherein the number n of light sources is two.

106. The image forming apparatus according to claim 80, wherein the number n of light sources is two.

107. The image forming apparatus according to claim 82, wherein the number n of light sources is two.

108. The image forming apparatus according to claim 83, wherein the number n of light sources is two.

109. The image forming apparatus according to claim 67, wherein the deflecting device includes two optical deflectors configured to individually deflect the respective light fluxes.

110. The image forming apparatus according to claim 68, wherein the deflecting device includes two optical deflectors configured to individually deflect the respective light fluxes.

111. The mage forming apparatus according to claim 79, wherein the deflecting device includes two optical deflectors configured to individually deflect the light corresponding fluxes.

112. The image forming apparatus according to claim 80, wherein the deflecting device includes two optical deflectors configured to individually deflect the respective light fluxes.

113. The image forming apparatus according to claim 82, wherein the deflecting device includes two optical deflectors configured to individually deflect the respective light fluxes.

114. The image forming apparatus according to claim 83, wherein the deflecting device includes two optical deflectors configured to individually deflect the respective light fluxes.

115. The image forming apparatus according to claim 109, wherein the scan imaging optical device includes two image scanners configured to individually converge the respective light fluxes from said light sources toward one of said areas.

116. The image forming apparatus according to claim 110, wherein the scan imaging optical device includes two image scanners configured to individually converge the respective light fluxes from said light sources toward one of said areas.

117. The image forming apparatus according to claim 111, wherein the scan imaging optical device includes two image scanners configured to individually converge the respective light fluxes from said light sources toward one of said areas.

118. The image forming apparatus according to claim 112, wherein the scan imaging optical device includes two image scanners configured to individually converge the respective light fluxes from said light sources toward one of said areas.

119. The image forming apparatus according to claim 113, wherein the scan imaging optical device includes two image scanners configured to individually converge the respective light fluxes from said light sources toward one of said areas.

120. The image forming apparatus according to claim 114, wherein the scan imaging optical device includes two image scanners configured individually converge the respective light fluxes from said light sources toward one of said scanning areas.

121. The image forming apparatus according to claim 67, wherein the optical scanning device further comprises:

a photo-receptor at a starting side and a photo-receptor at an ending side of the scan imaging optical device configured to photo-receive the deflected light fluxes for each of said n partial scanning portions.

122. The image forming apparatus according to claim 68, wherein the optical scanning device further comprises:

a photo-receptor at a starting side and a photo-receptor at an ending side of the scan imaging optical device configured to photo-receive the deflected light fluxes for each of said n partial scanning portions.

123. The image forming apparatus according to claim 79, wherein the optical scanning device further comprises:

a photo-receptor at a starting side and a photo-receptor at an ending side of the scan imaging optical device configured to photo-receive the deflected light fluxes for each of said n partial scanning portions.

124. The image forming apparatus according to claim 80, wherein the optical scanning device further comprises:

a photo-receptor at a starting side and a photo-receptor at an ending side of the scan imaging optical device configured to photo-receive the deflected light fluxes for each of said n partial scanning portions.

125. The image forming apparatus according to claim 82, wherein the optical scanning device further comprises:

a photo-receptor at a starting side and a photo-receptor at an ending side of the scan imaging optical device configured to photo-receive the deflected light fluxes for each of said n partial scanning portions.

126. The image forming apparatus according to claim 83, wherein the optical scanning device further comprises:

a photo-receptor at a starting side and a photo-receptor at an ending side of the scan imaging optical device configured to photo-receive the deflected light fluxes for each of said n partial scanning portions.

127. The image forming apparatus according to claim 121, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

128. The image forming apparatus according to claim 122, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

129. The image forming apparatus according to claim 123, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

130. The image forming apparatus according to claim 124, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

131. The image forming apparatus according to claim 125, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

132. The image forming apparatus according to claim 126, wherein one of said photo-receptors is placed between adjacent partial scanning portions and is configured to photo-receive deflected light flux at an ending side of one partial scanning portion of said adjacent partial scanning portions and to photo-receive deflected light flux at a starting side of another partial scanning portion of said adjacent partial scanning portions.

133. An optical scanning device which divides an area to be scanned on a surface to be scanned into n (wherein $n \geq 2$) partial scanning portions in a longitudinal direction thereof, comprising:

n light sources respectively corresponding to said n partial scanning portions and configured to optically scan said n partial scanning portions with respective light fluxes from said n light sources thereby to scan said areas;

deflecting means for deflecting the respective light fluxes; and optical means for converging the light fluxes deflected by said deflecting means toward said surface to be scanned, such that each light flux from said light sources forms an optical spot on a corresponding partial scanning portion of said n partial scanning portions, wherein a line width Li, where i=1 through n, lines formed by scanning with a light flux near a center portion of an $i^{th}$ partial scanning portion of said n partial scanning portions is determined by an optical scanning condition set such that an average value Ave(Li), a maximum value Max(Li), and a minimum value Min (Li), of line widths Li of said one-dot lines satisfy a line width condition of:

$$\mathrm{Max}(Li)/1.15 < Ave(Li) < \mathrm{Min}(Li)/0.85.$$

134. An optical scanning device which divides an area to be scanned on a surface to be scanned into n (wherein $n \geq 2$) partial scanning portions in a longitudinal direction thereof, comprising:

n light sources respectively corresponding to said n partial scanning portions and configured to optically scan said n partial scanning portions with respective light fluxes from said n light sources thereby to scan said areas;

deflecting means for deflecting the respective light fluxes; and optical means for converging the light fluxes deflected by said deflecting means toward said surface to be scanned, such that each light flux from said light sources forms an optical spot on a corresponding partial scanning portion of said n partial scanning portions, wherein a line width Li, where i=1 through n, and a line concentration Di of one-dot lines formed by scanning with a corresponding light flux near a center portion of an i partial scanning portion of said n partial scanning portions are determined by an optical scanning condition set such that an average value $\mathrm{Ave}\{\sqrt{(Li)} \times Di^{\wedge}(1/3)\}$, a maximum value $\mathrm{Max}\{\sqrt{(Li)} \times Di^{\wedge}(1/3)\}$, and a minimum value Min $\{\sqrt{}(Li) \times Di\hat{}(\frac{1}{5})\}$, of computation values $\sqrt{}(Li) \times Di\hat{}(\frac{1}{5})$ of said one-dot lines satisfy a first condition of:

$$\text{Max}\{\sqrt{}(Li) \times Di\hat{}(\frac{1}{5})\}/1.15 < Ave\{\sqrt{}(Li) \times Di\hat{}(\frac{1}{5})\} < \text{Min}\{\sqrt{}(Li) \times Di\hat{}(\frac{1}{5})\}/0.85.$$

135. An optical scanning device which divides an area to be scanned on a surface to be scanned into n (wherein n≧2) partial scanning portions in a longitudinal direction thereof, comprising:
   n light sources respectively corresponding to said n partial scanning portions and configured to optically scan said n partial scanning portions with respective light fluxes from said n light sources thereby to scan said areas;
   deflecting means for deflecting the respective light fluxes; and
   optical means for converging the light fluxes deflected by said deflecting means toward said surface to be scanned, such that each light flux from said light sources forms an optical spot on a corresponding partial scanning portion of said n partial scanning portions,
   wherein a line width ratio $L_i/L_{i+1}$, where i=1 through n−1, of one-dot lines formed by scanning with a light flux elongated in a sub-scanning direction near a seam between an $i^{th}$ partial scanning portion and an $i+1^{th}$ partial scanning portion, denoted as a sub-scanning line width ratio KS, is determined by an optical scanning condition set such that the sub-scanning line width ratio KS satisfies a ratio condition of:

$$0.9 < KS < 1.1.$$

136. An optical scanning device which divides an area to be scanned on a surface to be scanned into n (wherein n≧2) partial scanning portions in a longitudinal direction thereof, comprising:
   n light sources respectively corresponding to said n partial scanning portions and configured to optically scan said n partial scanning portions with respective light fluxes from said n light sources thereby to scan said areas;
   deflecting means for deflecting the respective light fluxes; and
   optical means for converging the light fluxes deflected by said deflecting means toward said surface to be scanned, such that each light flux from said light sources forms an optical spot on a corresponding partial scanning portion of said n partial scanning portions,
   wherein a line width ratio $L_i/L_{i+1}$, where i=1 through n−1, of one-dot lines formed by scanning with a light flux elongated in a main scanning direction near a seam between an $i^{th}$ partial scanning portion and an $i+1^{th}$ partial scanning portion, denoted as a main scanning line width ratio KM, is determined by an optical scanning condition set such that the main scanning line width ratio KM satisfies a ratio condition of:

$$0.93 < KM < 1.07.$$

137. An optical scanning device which divides an area to be scanned on a surface to be scanned into n (wherein n≧2) partial scanning portions in a longitudinal direction thereof, comprising:
   n light sources respectively corresponding to said n partial scanning portions and configured to optically scan said n partial scanning portions with respective light fluxes from said n light sources thereby to scan said areas;
   deflecting means for deflecting the respective light fluxes; and
   optical means for converging the light fluxes deflected by said deflecting means toward said surface to be scanned, such that each light flux from said light sources forms an optical spot on a corresponding partial scanning portion of said n partial scanning portions,
   wherein a line width ratio $L_i/L_{i+1}$, where i=1 through n−1 of one-dot lines formed by scanning with a light flux elongated in a sub-scanning direction near a seam between an $i^{th}$ partial scanning portion and an $i+1^{th}$ partial scanning portion, denoted as a sub-scanning line width ratio KS, and a line concentration ratio $D_i/D_{i+1}$, denoted as a line concentration ratio HS, and are defined by an optical scanning condition set such that a computation amount $\sqrt{}(KS) \times HS\hat{}(\frac{1}{5})$ of said one-dot lines satisfies a condition of:

$$0.9 < \sqrt{}(KS) \times HS\hat{}(\frac{1}{5}) < 1.1.$$

138. An optical scanning device which divides an area to be scanned on a surface to be scanned into n (wherein n≧2) partial scanning portions in a longitudinal direction thereof, comprising:
   n light sources respectively corresponding to said n partial scanning portions and configured to optically scan said n partial scanning portions with respective light fluxes from said n light sources thereby to scan said areas;
   deflecting means for deflecting the respective light fluxes; and
   optical means for converging the light fluxes deflected by said deflecting means toward said surface to be scanned, such that each light flux from said light sources forms an optical spot on a corresponding partial scanning portion of said n partial scanning portions,
   wherein a line width ratio $L_i/L_{i+1}$, where i=1 through n−1, of one-dot lines formed by scanning with a light flux elongated in a main scanning direction near a seam between an $i^{th}$ partial scanning portion and an $i+1^{th}$ partial scanning portion, denoted as a main scanning line width ratio KM, and a line concentration ratio $D_i/D_{i+1}$, denoted as a line concentration ratio HM, are defined by an optical scanning condition set such that a computation amount $\sqrt{}(KM) \times HM\hat{}(\frac{1}{5})$ of said one-dot lines satisfies a condition of:

$$0.93 < \sqrt{}(KM) \times HM\hat{}(\frac{1}{5}) < 1.07.$$

139. An image forming apparatus, comprising:
   a photosensitive member configured to form a latent image thereupon;
   an optical scanning device configured to optically scan the photosensitive member to form the latent image; and
   developing means for developing the latent image into a toner image and to thereby obtain an image;
   wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:
      deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width Li, where i=1 through n, of one-dot lines formed by scanning with a light flux near a center portion of an $i^{th}$ partial scanning portion of said n partial scanning portions is determined by an optical scanning condition set such that an average value Ave(Li), a maximum value Max(Li), and a minimum value Min (Li), of line widths Li of said one-dot lines satisfy a condition of:

Max($Li$)/1.15<Ave($Li$)<Min($Li$)/0.85.

140. An image forming apparatus, comprising:

a photosensitive member configured to form a latent image thereupon;

an optical scanning device configured to optically scan the photosensitive member to form the latent image; and developing means for developing the latent image into a toner image and to thereby obtain an image;

wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:

deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width Li, where i=1 through n, and a line concentration Di of one-dot lines formed by scanning with a light flux near a center portion of an $i^{th}$ partial scanning portion of said n partial scanning portions are determined by an optical scanning condition set such that an average value Ave{√(Li)×Di^(⅕)}, a maximum value Max{√(Li)×Di^(⅕)}, and a minimum value Min {√(Li)×Di^(⅕)}, of computation values √(Li)×Di^(⅕) of said one-dot lines satisfy a condition of:

Max{√($Li$)×$Di$^(⅕)}/1.15<Ave{√($Li$)×$Di$^(⅕)}<Min{√($Li$)×$Di$^(⅕)}/0.85.

141. An image forming apparatus, comprising:

a photosensitive member configured to form a latent image thereupon;

an optical scanning device configured to optically scan the photosensitive member to form the latent image; and developing means for developing the latent image into a toner image and to thereby obtain an image;

wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:

deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a sub-scanning direction near a seam between an $i^{th}$ partial scanning portion and an $i+1^{th}$ partial scanning portion, denoted as a sub-scanning line width ratio KS, is determined by an optical scanning condition set such that the sub-scanning line width ratio KS satisfies a condition of:

0.9<KS<1.1.

142. An image forming apparatus, comprising:

a photosensitive member configured to form a latent image thereupon;

an optical scanning device configured to optically scan the photosensitive member to form the latent image; and developing means for developing the latent image into a toner image and to thereby obtain an image;

wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:

deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width ratio $L_i/L_{i+1}$, where i=1 through n−1, of one-dot lines formed by scanning with a corresponding light flux long in a main scanning direction near a seam between an $i^{th}$ partial scanning portion and an $i+1^{th}$ partial scanning portion, denoted as a main scanning line width ratio KM, is determined by an optical scanning condition set such that the main scanning line width ratio KM satisfies a condition of:

0.93<KM<1.07.

143. An image forming apparatus, comprising:

a photosensitive member configured to form a latent image thereupon;

an optical scanning device configured to optically scan the photosensitive member to form the latent image; and developing means for developing the latent image into a toner image and to thereby obtain an image;

wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:

deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a sub-scanning direction near a seam between an $i^{th}$ partial scanning portion and an i+1$^{th}$ partial scanning portion, denoted as a sub-scanning line width ratio KS, and a line concentration ratio $D_i/D_{i+1}$, denoted as a line concentration ratio HS, are determined by an optical scanning condition set such that a computation amount $\sqrt{(KS) \times HS\hat{\ }(1/5)}$ of said one-dot lines satisfies a condition of:

$$0.9 < \sqrt{(KS) \times HS\hat{\ }(1/5)} < 1.1.$$

144. An image forming apparatus, comprising:

a photosensitive member configured to form a latent image thereupon;

an optical scanning device configured to optically scan the photosensitive member to form the latent image; and developing means for developing the latent image into a toner image and to thereby obtain an image;

wherein the optical scanning device is configured to divide an area to be scanned on a surface to be scanned into n (wherein n≧2) partial scanning portions in a longitudinal direction and includes n light sources respectively corresponding to said n partial scanning portions and configured to optically scan said n partial scanning portions with respective light fluxes from said n light sources thereby to scan said areas, said optical scanning device further comprising:

deflecting means for deflecting the respective light fluxes; and optical means for converging light fluxes deflected by said deflecting means toward said surface to be scanned, such that each light flux from the light sources forms an optical spot on a corresponding partial scanning portion of said n partial scanning portions, wherein a line width ratio $L_i/L_{i+1}$, where i=1 through n−1, of one-dot lines formed by scanning with a light flux elongated in a main scanning direction near a seam between an $i^{th}$ partial scanning portion and an i+1$^{th}$ partial scanning portion, denoted as a main scanning line width ratio KM, and a line concentration ratio $D_i/D_{i+1}$, denoted as a line concentration ratio HM, are determined by an optical scanning condition set such that a computation amount $\sqrt{(KM) \times HM\hat{\ }(1/5)}$ of said one-dot lines satisfies a condition of:

$$0.93 < \sqrt{(KM) \times HM\hat{\ }(1/5)} < 1.07.$$

145. An optical scanning method which divides an area to be scanned on a surface to be scanned into n (wherein n≧2) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a line width Li, where i=1 through n, of said one-dot lines formed by scanning with a light flux near a center portion of an $i^{th}$ partial scanning portion of said n partial scanning portions, setting an optical scanning condition such that an average value Ave(Li), a maximum value Max(Li), and a minimum value Min (Li), of line widths Li of said one-dot lines satisfy a line width condition of:

$$\text{Max}(Li)/1.15 < Ave(Li) < \text{Min}(Li)/0.85.$$

146. An optical scanning method which divides an area to be scanned on a surface to be scanned into n (wherein n≧2) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a line width Li, where i=1 through n, and a line concentration Di of said one-dot lines formed by scanning with a light flux near a center portion of an $i^{th}$ partial scanning portion of said n partial scanning portions, setting a first optical scanning condition such that an average value Ave{$\sqrt{(Li) \times Di\hat{\ }(1/5)}$}, a maximum value Max{$\sqrt{(Li) \times Di\hat{\ }(1/5)}$}, and a minimum value Min {$\sqrt{(Li) \times Di\hat{\ }(1/5)}$}, of computation values $\sqrt{(Li) \times Di\hat{\ }(1/5)}$ of said one-dot lines satisfy a first condition of:

$$\text{Max}\{\sqrt{(Li) \times Di\hat{\ }(1/5)}\}/1.15 < Ave\{\sqrt{(Li) \times Di\hat{\ }(1/5)}\} < \text{Min}\{\sqrt{(Li) \times Di\hat{\ }(1/5)}\}/0.85.$$

147. The optical scanning method according to claim 146, wherein, in the first optical scanning condition setting step, a second optical scanning condition is set such that the average value Ave{$\sqrt{(Li) \times Di\hat{\ }(1/5)}$}, the maximum value Max{$\sqrt{(Li) \times Di\hat{\ }(1/5)}$}, and the minimum value Min {$\sqrt{(Li) \times Di\hat{\ }(1/5)}$}, of the computation value $\sqrt{(Li) \times Di\hat{\ }(1/5)}$ satisfy a second condition of:

$$\text{Max}\{\sqrt{(Li) \times Di\hat{\ }(1/5)}\}/1.07 < Ave\{\sqrt{(Li) \times Di\hat{\ }(1/5)}\} < \text{Min}\{\sqrt{(Li) \times Di\hat{\ }(1/5)}\}/0.93.$$

148. The optical scanning method of according to claim 145, wherein, in the forming one-dot lines step near the center portion of the $i^{th}$ partial scanning portion, each of the one-dot lines is formed by scanning with light flux elongated in a main scanning direction.

149. The optical scanning method according to claim 146, wherein, in the forming one-dot lines step near the center portion of the $i^{th}$ partial scanning portion, each of the one-dot lines is formed by scanning with light flux elongated in a main scanning direction.

150. The optical scanning method according to claim 145, wherein, in the forming one-dot lines step near the center portion of the $i^{th}$ partial scanning portion, each of the one-dot lines is formed by scanning with light flux elongated in a sub-scanning direction.

151. The optical scanning method according to claim 146, wherein, in the forming one dot lines step near the center portion of the $i^{th}$ partial scanning portion, each of the one-dot lines is formed by scanning with light flux elongated in a sub-scanning direction.

152. The optical scanning method according to claim 145, wherein, in the forming one dot lines step near the center portion of the $i^{th}$ partial scanning portion, each of the one-dot lines is formed by scanning with light flux inclined in the main scanning direction.

153. The optical scanning method according to claim 146, wherein, in the forming one dot lines step near the center portion of the $i^{th}$ partial scanning portion, each of the one-dot lines is formed by scanning with light flux inclined in the main scanning direction.

154. The optical scanning method according to claim 145, wherein, in the forming one-dot lines step near the center portion of the $i^{th}$ partial scanning portion, the line condition is satisfied by one-dot lines elongated in the main scanning direction and by one-dot lines elongated in the sub-scanning direction.

155. The optical scanning method according to claim 146, wherein, in the forming one-dot lines step near the center portion of the $i^{th}$ partial scanning portion, the first condition is satisfied by the one-dot lines elongated in the main scanning direction and by one-dot lines elongated in the sub-scanning direction.

156. The optical scanning method according to claim 147, wherein, in the forming one-dot lines step near the center portion of the $i^{th}$ partial scanning portion, the second condition is satisfied by one-dot lines elongated in the main scanning direction and by one-dot lines elongated in the sub-scanning direction.

157. An optical scanning method which divides an area to be scanned on a surface to be scanned into n (wherein $n \geq 2$) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a first line width ratio $L_i/L_{i+1}$, where i=1 through n−1, of said one-dot lines formed by scanning with a light flux elongated in a sub-scanning direction near a seam between an $i^{th}$ partial scanning portion and an $i+1^{th}$ partial scanning portion denoted as a sub-scanning line width ratio KS, setting a first optical scanning condition such that the sub-scanning line width ratio KS satisfies a first ratio condition of:

0.9<KS<1.1.

158. An optical scanning method which divides an area to be scanned on a surface to be scanned into n (wherein $n \geq 2$) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a line width ratio $L_i/L_{i+1}$, where i=1 through n−1, of said one-dot lines formed by scanning with a light flux elongated in a main scanning direction near a seam between an $i^{th}$ partial scanning portion and an $i+1^{th}$ partial scanning portion denoted as a main scanning line width ratio KM, setting an optical scanning condition such that the main scanning line width ratio KM satisfies a condition of:

0.93<KM<1.07.

159. The optical scanning method according to claim 157, wherein, in the first optical scanning condition setting step, with a second line width ratio $L_i/L_{i+1}$, such that i=1 through n−1, of one-dot lines formed by scanning with a light flux elongated in a main scanning direction near the seam between the $i^{th}$ partial scanning portion and the $i+1^{th}$ partial scanning portion, denoted as a main scanning line width ratio KM, setting a second optical scanning condition such that the main scanning line width ratio KM satisfies a second ratio condition of:

0.93<KM<1.07.

160. An optical scanning method which divides an area to be scanned on a surface to be scanned into n (wherein $n \geq 2$) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a first line width ratio $L_i/L_{i+1}$, where i=1 through n−1, of said one-dot lines formed by scanning with a light flux elongated in a sub-scanning direction near a seam between an $i^{th}$ partial scanning portion and an $i+1^{th}$ partial scanning portion denoted as a sub-scanning line width ratio KS and a first line concentration ratio $D_i/D_{i+1}$ denoted as a line concentration ratio HS, setting a first optical scanning condition such that a computation amount $\sqrt{(KS) \times HS\hat{}(1/5)}$ of said one-dot lines satisfies a first condition of:

$$0.9 < \sqrt{(KS) \times HS\hat{}(1/5)} < 1.1.$$

161. An optical scanning method which divides an area to be scanned on a surface to be scanned into n (wherein n≥2) partial scanning portions in a longitudinal direction thereof and which uses n light sources respectively corresponding to said n partial scanning portions to optically scan said n partial scanning portions with respective light fluxes from said n light sources thereby to scan said areas, the method comprising:

deflecting the respective light fluxes from said n light sources with a deflecting device;

converging light fluxes deflected by said deflecting device toward said surface to be scanned with a scan imaging optical device, such that each light flux from the light sources forms an optical spot on a corresponding partial scanning portion of said n partial scanning portions;

forming one-dot lines on each partial scanning portion of said n partial scanning portions by scanning with one of said respective light fluxes; and with a line width ratio $L_i/L_{i+1}$, where i=1 through n−1, of said one-dot lines formed by scanning with a light flux elongated in a main scanning direction near a seam between an $i^{th}$ partial scanning portion and an $i+1^{th}$ partial scanning portion denoted as a main scanning line width ratio KM and a line concentration ratio $D_i/D_{i+1}$ denoted as a line concentration ratio HM, setting an optical scanning condition such that a computation amount $\sqrt{(KM) \times HM\hat{}(1/5)}$ of said one-dot lines satisfies a computational condition of:

$$0.93 < \sqrt{(KM) \times HM\hat{}(1/5)} < 1.07.$$

162. The optical scanning method according to claim 160, wherein, in the first optical scanning condition setting step, with a second line width ratio $L_i/L_{i+1}$ of said one-dot lines formed by scanning with a light flux elongated in a main scanning direction near the seam between the $i^{th}$ partial scanning portion and the $i+1^{th}$ partial scanning portion denoted as a main scanning line width ratio KM and a second line concentration ratio $D_i/D_{i+1}$ denoted as a line concentration ratio HM, setting a second optical scanning condition such that the computation amount $\sqrt{(KM) \times HM\hat{}(1/5)}$ satisfies a second condition of:

$$0.93 < \sqrt{(KM) \times HM\hat{}(1/5)} < 1.07.$$

163. The optical scanning method according to claim 145, further comprising:
adjusting independently an intensity from each of said n light sources.

164. The optical scanning method according to claim 146, further comprising:
adjusting independently an intensity from each of said n light sources.

165. The optical scanning method according to claim 157, further comprising:
adjusting independently an intensity from each of said n light sources.

166. The optical scanning method according to claim 158, further comprising:
adjusting independently an intensity from each of said n light sources.

167. The optical scanning method according to claim 160, further comprising:
adjusting independently an intensity from each of said n light sources.

168. The optical scanning method according to claim 161, further comprising:
adjusting independently an intensity from each of said n light sources.

169. The optical scanning method according to claim 145, further comprising:
setting independently a driving duty ratio of each of said n light sources.

170. The optical scanning method according to claim 146, further comprising:
setting independently a driving duty ratio of each of said n light sources.

171. The optical scanning method according to claim 157, further comprising:
setting independently a driving duty ratio of each of said n light sources.

172. The optical scanning method according to claim 158, further comprising:
setting independently a driving duty ratio of each of said n light sources.

173. The optical scanning method according to claim 160, further comprising:
setting independently a driving duty ratio of each of said n light sources.

174. The optical scanning method according to claim 161, further comprising:
setting independently a driving duty ratio of each of said n light sources.

175. The optical scanning method according to claim 145, further comprising:
forming beams of said light fluxes from each of said n light sources with an n number of apertures; and
setting independently openings of said n number of apertures.

176. The optical scanning method according to claim 146, further comprising:
forming beams of said light fluxes from each of said n light sources with an n number of apertures; and
setting independently openings of said n number of apertures.

177. The optical scanning method according to claim 157, further comprising:
forming beams of said light fluxes from each of said n light sources with an n number of apertures; and
setting independently openings of said n number of apertures.

178. The optical scanning method according to claim 158, further comprising:
forming beams of said light fluxes from each of said n light sources with an n number of apertures; and
setting independently openings of said n number of apertures.

179. The optical scanning method according to claim 160, further comprising:

forming beams of said light fluxes from each of said n light sources with an n number of apertures; and setting independently openings of said n number of apertures.

180. The optical scanning method according to claim 161, further comprising:

forming beams of said light fluxes from each of said n light sources with an n number of apertures; and setting independently openings of said n number of apertures.

181. The optical scanning method according to claim 145, wherein, in the step of deflecting the respective light fluxes, the number n of light sources is two.

182. The optical scanning method according to claim 146, wherein, in the step of deflecting the respective light fluxes, the number n of light sources is two.

183. The optical scanning method according to claim 157, wherein, in the step of deflecting the respective light fluxes, the number n of light sources is two.

184. The optical scanning method according to claim 158, wherein, in the step of deflecting the respective light fluxes, the number n of light sources is two.

185. The optical scanning method according to claim 160, wherein, in the step of deflecting the respective light fluxes, the number n of light sources is two.

186. The optical scanning method according to claim 161, wherein in the step of deflecting the respective light fluxes, the number n of light sources is two.

187. The optical scanning method according claim 181, wherein, in the step of deflecting the respective light fluxes, the deflecting device includes two optical deflectors for individually deflecting the respective light fluxes.

188. The optical scanning method according claim 182, wherein, in the step of deflecting the respective light fluxes, the deflecting device includes two optical deflectors for individually deflecting the respective light fluxes.

189. The optical scanning method according to claim 183, wherein, in the step of deflecting the respective light fluxes, the deflecting device includes two optical deflectors for individually deflecting the respective light fluxes.

190. The optical scanning method according to claim 184, wherein, in the step of deflecting the respective light fluxes, the deflecting device includes two optical deflectors for individually deflecting the respective light fluxes from the light sources.

191. The optical scanning method according claim 185, wherein, in the step of deflecting the respective light fluxes, the deflecting device includes two optical deflectors for individually deflecting the respective light fluxes from the light sources.

192. The optical scanning method according to claim 186, wherein, in the step of deflecting the respective light fluxes, the deflecting device includes two optical deflectors for individually deflecting the light fluxes from the light sources.

193. The optical scanning method according to claim 181, wherein, in the step of converging the respective light fluxes, the scan imaging optical device includes two image scanners for individually converging the respective light fluxes from said light sources toward one of said areas.

194. The optical scanning method according to claim 182, wherein, in the step of converging the respective light fluxes, the scan imaging optical device includes two image scanners for individually converging the respective light fluxes from said light sources toward one of said areas.

195. The optical scanning method according to claim 183, wherein, in the step of converging the respective light fluxes, the scan imaging optical device includes two image scanners for individually converging the respective light fluxes from said light sources toward one of said areas.

196. The optical scanning method according to claim 184, wherein, in the step of converging the respective light fluxes, the scan imaging optical device includes two image scanners for individually converging the respective light fluxes from said light sources toward one of said areas.

197. The optical scanning method according to claim 185, wherein, in the step of converging the respective light fluxes, the scan imaging optical device includes two image scanners for individually converging the respective light fluxes from said light sources toward one of said areas.

198. The optical scanning method according to claim 186, wherein, in the step of converging the respective light fluxes, the scan imaging optical device includes two image scanners for individually converging the respective light fluxes from said light sources toward one of said areas.

199. The optical scanning method according to claim 145, further comprising:

receiving said deflected light fluxes with a photo-receptor at a starting side and a photo-receptor at an ending side of the scan imaging optical device for each of said n partial scanning portions.

200. The optical scanning method according to claim 146, further comprising:

receiving said deflected light fluxes with a photo-receptor at a starting side and a photo-receptor at an ending side of the scan imaging optical device for each of said n partial scanning portions.

201. The optical scanning method according to claim 157, further comprising:

receiving said deflected light fluxes with a photo-receptor at a starting side and a photo-receptor at an ending side of the scan imaging optical device for each of said n partial scanning portions.

202. The optical scanning method according to claim 158, further comprising:

receiving said deflected light fluxes with a photo-receptor at a starting side and a photo-receptor at an ending side of the scan imaging optical device for each of said n partial scanning portions.

203. The optical scanning method according to claim 160, further comprising:

receiving said deflected light fluxes with a photo-receptor at a starting side and a photo-receptor at an ending side of the scan imaging optical device for each of said n partial scanning portions.

204. An optical scanning device according to claim 161, further comprising:

receiving said deflected light fluxes with a photo-receptor at a starting side and a photo-receptor at an ending side of the scan imaging optical device for each of said n partial scanning portions.

205. The optical scanning method according to claim 199, wherein, in the step of receiving said deflected light fluxes, one of said photo-receptors is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

206. The optical scanning method according to claim 200, wherein, in the step of receiving deflected light fluxes, the photo-receptor is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

207. The optical scanning method according to claim 201, wherein, in the step of receiving deflected light fluxes, the photo-receptor is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

208. The optical scanning method according to claim 202, wherein, in the step of receiving deflected light fluxes, the photo-receptor is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

209. The optical scanning method according to claim 203, wherein, in the step of receiving deflected light fluxes, the photo-receptor is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

210. The optical scanning method according to claim 204, wherein, in the step of receiving deflected light fluxes, the photo-receptor is placed between adjacent partial scanning portions and photo-receives deflected light flux at an ending side of one partial scanning portion of said adjacent partial scanning portions and photo-receives deflected light flux at a starting side of another partial scanning portion of said adjacent partial scanning portions.

211. The optical scanning method according to claim 199, further comprising:
adjusting a driving clock for each light source corresponding to a partial scanning portion based on a difference in a detection time of the photo-receptors at the scanning starting side and the scanning ending side of each partial scanning portion.

212. The optical scanning method according to claim 200, further comprising:
adjusting a driving clock for each light source corresponding to a partial scanning portion based on difference in detection time of the photo-receptors at the optical scanning starting side and the optical scanning ending side of each partial scanning portion.

213. The optical scanning method according to claim 201, further comprising:
adjusting a driving clock for each light source corresponding to a partial scanning portion based on difference in detection time of the photo-receptors at the optical scanning starting side and the optical scanning ending side of each partial scanning portion.

214. The optical scanning method according to claim 202, further comprising:
adjusting a driving clock for each light source corresponding to a partial scanning portion based on difference in detection time of the photo-receptors at the optical scanning starting side and the optical scanning ending side of each partial scanning portion.

215. The optical scanning method according to claim 203, further comprising:
adjusting a driving clock for each light source corresponding to a partial scanning portion based on difference in detection time of the photo-receptors at the optical scanning starting side and the optical scanning ending side of each partial scanning portion.

216. The optical scanning method according to claim 204, further comprising:
adjusting a driving clock for each light source corresponding to a partial scanning portion based on difference in detection time of the photo-receptors at the optical scanning starting side and the optical.

* * * * *